US011902735B2

(12) United States Patent
Khaleghimeybodi

(10) Patent No.: US 11,902,735 B2
(45) Date of Patent: *Feb. 13, 2024

(54) ARTIFICIAL-REALITY DEVICES WITH DISPLAY-MOUNTED TRANSDUCERS FOR AUDIO PLAYBACK

(71) Applicant: Meta Platforms Technologies, LLC, Menlo Park, CA (US)

(72) Inventor: Morteza Khaleghimeybodi, Bothell, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/892,962

(22) Filed: Aug. 22, 2022

(65) Prior Publication Data
US 2022/0408177 A1 Dec. 22, 2022

Related U.S. Application Data

(63) Continuation of application No. 17/127,674, filed on Dec. 18, 2020, now Pat. No. 11,445,288, which is a
(Continued)

(51) Int. Cl.
*H04R 1/10* (2006.01)
*G02B 27/01* (2006.01)
*H04S 1/00* (2006.01)

(52) U.S. Cl.
CPC .......... *H04R 1/1075* (2013.01); *G02B 27/017* (2013.01); *H04S 1/002* (2013.01);
(Continued)

(58) Field of Classification Search
CPC .......... G02B 2027/0178; G02B 27/017; G02B 2027/0138; H04R 1/1075; H04R 2460/13;
(Continued)

(56) References Cited

U.S. PATENT DOCUMENTS 9,965,471 B2 * 5/2018 Huston ................ G06T 19/006
2013/0022220 A1 * 1/2013 Dong ................ G02B 27/0176
381/151

OTHER PUBLICATIONS

Khaleghimeybodi., Notice of Allowance dated Sep. 4, 2020 for U.S. Appl. No. 16/416,015, 8 pages.
(Continued)

*Primary Examiner* — Brian Ensey
(74) *Attorney, Agent, or Firm* — Morgan, Lewis & Bockius LLP

(57) ABSTRACT

An artificial-reality device for audio playback is provided. The artificial-reality device includes: (i) a head-mounted display including at least one lens, and (ii) one or more transducers, coupled to the head-mounted display. The transducers are configured to generate signals that vibrate the at least one lens of the head-mounted display. The at least one lens generates acoustic waves that correspond to media presented by the head-mounted display when vibrated by the one or more transducers. Characteristics of the signals generated by the one or more transducers cause the acoustic waves generated by the at least one lens to be directed towards at least one ear of a user of the artificial reality device. Values of the characteristics for the signals are determined based on: (i) the media presented by the head-mounted display and (ii) characteristics of the at least one lens.

20 Claims, 23 Drawing Sheets
(2 of 23 Drawing Sheet(s) Filed in Color)

Related U.S. Application Data continuation of application No. 16/416,015, filed on May 17, 2019, now Pat. No. 10,873,800.

(52) U.S. Cl.
CPC .. *G02B 2027/0178* (2013.01); *H04R 2460/13* (2013.01); *H04R 2499/15* (2013.01)

(58) Field of Classification Search
CPC ...... H04R 2499/15; H04R 1/406; H04R 5/02; H04R 5/027; H04S 1/02; H04S 7/304; H04S 2400/15; H04S 2420/01
See application file for complete search history.

(56) References Cited

OTHER PUBLICATIONS

Khaleghimeybodi., Office Action dated Apr. 29, 2020 for U.S. Appl. No. 16/416,015, 9 pages.
"LG Continues to Push Boundaries of Exceptional Smartphone Audio with New G Series," LG Newsroom [online], Feb. 14, 2019 [retrieved on May 20, 2019], 4 pages, retrieved from the internet: URL: http://www.lgnewsroom.com/2019/02/lg-continues-to-push-boundaries-of-exceptional-smartphone-audio-with-new-g-series/.
Non-Final Office Action dated Feb. 1, 2022 for U.S. Appl. No. 17/127,674, filed Dec. 18, 2020, 8 pages.
Notice of Allowance dated May 12, 2022 for U.S. Appl. No. 17/127,674, filed Dec. 18, 2020, 9 pages.

\* cited by examiner

ARTIFICIAL-REALITY DEVICES WITH DISPLAY-MOUNTED TRANSDUCERS FOR AUDIO PLAYBACK

RELATED APPLICATIONS

This application is a continuation of U.S. patent application Ser. No. 17/127,674, entitled "Artificial-Reality Devices with Display-Mounted Transducers for Audio Playback," filed Dec. 18, 2020, which is a continuation of U.S. patent application Ser. No. 16/416,015, entitled "Artificial-Reality Devices with Display-Mounted Transducers for Audio Playback," filed May 17, 2019, now U.S. Pat. No. 10,873,800, issued on Dec. 22, 2020, each of which is incorporated by reference herein in its entirety.

TECHNICAL FIELD

This application relates generally to the field of stereophony, including audio devices used in virtual-reality, augmented-reality, and/or mixed-reality systems.

BACKGROUND

Artificial-reality device devices have wide applications in various fields, including engineering design, medical surgery practice, military simulated practice, and video gaming. Audio is a critical element of any artificial-reality device (e.g., virtual, augmented, or mixed-reality devices). Artificial-reality devices typically include one or more audio devices (e.g., speakers) positioned in proximity to a user's ears, or audio devices that completely cover the user's ears, such as headphones. These audio devices, however, can be cumbersome, and prevent miniaturization of artificial-reality devices. Furthermore, conventional audio devices can prevent users of artificial-reality devices from hearing other important sounds, such as conversations of family and friends, or noises alerting users to other environmental factors, such as an approaching vehicle. Thus, there are some improvements that can be made to enhance the audio experience for a user of such artificial reality devices.

SUMMARY

Accordingly, there is a need for audio devices that help reduce a size and weight of artificial-reality devices, and also do not encumber a user's ability to hear. One solution is incorporating a high-bandwidth transducer (appropriate for audio bandwidth) that is configured to shake (i.e., vibrate) a display element of the artificial-reality device (e.g., the see-through display in augmented-reality headsets or the blocked-light display in virtual-reality and mixed-reality headsets). Specifically, as the transducer vibrates, the created vibration couples with the display element, causing the display element to vibrate. In doing so, the display element essentially acts as the diaphragm of a speaker. Not only does the display element display digital content, but it also creates corresponding acoustic waves (i.e., sound, audio). Importantly, the created acoustic waves (e.g., which may be created using head-related transfer functions) travel towards the user's ears and the user thus hears three-dimensional sound. Accordingly, the artificial-reality devices discussed herein are able to create audio without the use of conventional, cumbersome audio devices (e.g., headphones or earbuds).

(A1) In some embodiments, the solution explained above is implemented on an artificial-reality device that includes: (i) a head-mounted display having at least one lens, and (ii) one or more transducers, coupled to the head-mounted display, configured to generate signals that vibrate the at least one lens of the head-mounted display. The at least one lens generates (e.g., transmits or creates) acoustic waves that correspond to media presented by the head-mounted display when vibrated by the one or more transducers.

(A2) In some embodiments of A1, the head-mounted display further includes a frame, and at least one transducer of the one or more transducers is coupled to the frame of the head-mounted display. In some embodiments, each of the one or more transducers is coupled to the frame.

(A3) In some embodiments of A2, another transducer (or multiple other transducers) of the one or more transducers is (are) coupled to the at least one lens of the head-mounted display.

(A4) In some embodiments of A1, at least one transducer of the one or more transducers is coupled to the at least one lens of the head-mounted display. In some embodiments, each of the one or more transducers is coupled to the at least one lens of the head-mounted display.

(A5) In some embodiments of A4, the at least one transducer is positioned in a user's line of sight. In some embodiments, each of the one or more transducers is positioned in the user's line of sight.

(A6) In some embodiments of any of A1-A4, the at least one transducer is positioned along an edge of the at least one lens (i.e., not in the user's line of sight).

(A7) In some embodiments of any of A1-A6, the at least one lens is a first lens and the head-mounted display further includes a second lens. Furthermore, the one or more transducers are further configured to generate signals that vibrate the second lens, whereby the second lens generates acoustic waves that correspond to the media presented by the head-mounted display when vibrated by the one or more transducers. In some embodiments, one or more first transducers of the one or more transducers generate signals that vibrate the first lens, and one or more second transducers, different from the one or more first transducers, generate other signals that vibrate the second lens.

(A8) In some embodiments of A7, at least one of the acoustic waves generated by the first lens constructively interferes with at least one of the acoustic waves generated by the second lens at a location near one of a user's ears (e.g., at a target location, which may be predetermined). In addition, in some embodiments, at least one of the acoustic waves generated by the first lens destructively interferes with at least one of the acoustic waves generated by the second lens at a location near one of a user's ears.

(A9) In some embodiments of any of A7-A8, a first transducer of the one or more transducers is coupled to the first lens and a second transducer (different from the first transducer) of the one or more transducers is coupled to the second lens.

(A10) In some embodiments of any of A1-A9, the head-mounted display does not include any other audio generating device in addition to the at least one lens. For example, the head-mounted display does not include headphones or earbuds.

(A11) In some embodiments of any of A1-A10, (i) the one or more transducers are further configured to generate the signals at a frequency, (ii) the signals generated by the one or more transducers vibrate the at least one lens at the frequency, and (iii) a user of the artificial-reality device cannot visually perceive the vibration of the at least one lens at the frequency.

(A12) In some embodiments of any of A1-A11, a frequency of the signals generated by the one or more transducers ranges from 20 Hz to 20 KHz.

(A13) In some embodiments of any of A1-A12, characteristics of the signals generated by the one or more transducers cause the acoustic waves generated by the at least one lens to be directed towards one or both of the user's ears (e.g., the acoustic waves are not radiated omnidirectionally).

(A14) In some embodiments of A13, values of the characteristics for the signals are determined based on: (i) the media presented by the head-mounted display (e.g., direction of the sound and/or an intensity of the sound), (ii) one or more head-related transfer functions (HRTF) computed for a user wearing the head-mounted display, and (iii) characteristics of the at least one lens.

(A15) In some embodiments of any of A13-A14, the characteristics of the signals include one or more of: (i) frequency, (ii) amplitude, and (iii) phase.

(A16) In some embodiments of any of A1-A15, the head-mounted display further includes an acoustic sensor (e.g., a microphone) (or multiple acoustic sensors) configured to: (i) receive at least some of the acoustic waves generated by the at least one lens, and (ii) generate audio data based on the receiving. In addition, the one or more transducers are further configured to adjust the signals based on the audio data generated by the microphone (e.g., adjust values of characteristics for the signals, such as a frequency value, a phase value, or an amplitude value). In some embodiments, the acoustic sensor is used to calibrate the one or more transducers (e.g., the audio data can be used to tune each of the one or more transducers).

For audio delivery as described herein, the acoustic sensor (e.g., the microphone) is optional. In some embodiments, as detailed below, the acoustic sensor may be positioned at the opening of the ear-canal and is used to enhance audio playback (e.g., enhanced 3D audio playback). In such embodiments, it is helpful to know a ratio between a transfer function of the signal going to the transducer and the collected sound pressure at the opening of the ear-canal (or both ear-canals). This ratio can then be used for equalization (i.e., flattening the sound pressure at the entrance of each ear canal) and then HRTF filters may be used to deliver accurate 3D spatial sound to the user.

Further to the above, in some embodiments, 3D spatial sound is generated using a KEMAR HRTF (e.g., when a single acoustic sensor is used). In some embodiments, when binaural microphones are used (e.g., acoustic sensors positioned at each ear-canal), a higher quality 3D spatial sound can be delivered to the user by determining HRTF filters for each ear.

(A17) In some embodiments of A16, adjusting the signals based on the audio data causes the acoustic waves generated by the at least one lens to be focused in a selected direction (and/or at a selected location).

(A18) In another aspect, a system is provided that includes a computer (e.g., a neck band 205 as shown in FIG. 2) in communication with an artificial-reality device. The system is configured to implement any of A1-A17.

(B1) In accordance with some embodiments, a method is provided. The method is performed by the artificial-reality device of any of A1-A17. The method includes (i) presenting, by the head-mounted display, media for a virtual scene (or any artificial scene or any real word scene), and (ii) concurrently with the presenting, generating, via at least one transducer of the one or more transducers, signals that vibrate the at least one lens of the head-mounted display. The at least one lens generates acoustic waves that correspond to the media presented by the head-mounted display when vibrated by the at least one transducer.

(B2) In some embodiments of B1, the method further includes, before generating the signals: selecting the at least one transducer, from the one or more transducers, based at least in part on audio data for the media. The audio data is associated with a sound source in the virtual scene. For example, the sound source may be located to the left of the user's avatar in the virtual scene (or to the left of the user in augmented reality), and therefore, the user would expect sound originating from the sound source (i.e., the audio data) to be heard mostly by the user's left ear. Thus, the artificial-reality device selects the at least one transducer because the at least one transducer is best suited to create sound for the situation (e.g., create sound, through the at least one lens, that is heard mostly by the user's left ear).

In some embodiments, the audio data for the media is spatial audio. A key component of spatial audio is the modeling of head-related transfer functions (HRTFs). The HRTF is a filter defined over the spherical domain that describes how a listener's head, torso, and ear geometry affects incoming sound from all directions. The HRTF filter maps incoming sound arriving towards the center of the head (referred to as "head center") to the corresponding sound received by the user's left and right ears. In order to auralize the sound for a given source direction, an HRTF filter is computed for that direction, then convolved with dry input audio to generate binaural audio. When this binaural audio is played, in this case by the at least one lens as a result of the at least one transducer generating the signals, the listener hears the sound as if it came from the direction of the sound source. Accordingly, in some embodiments, the artificial-reality device selects the at least one transducer based on HRTFs.

(B3) In some embodiments of any of B1-B2, the method further includes, before generating the signals: determining values of characteristics for the signals generated by the at least one transducer based at least in part on the audio data. The characteristics include (but are not limited to) one or more of (i) frequency, (ii) amplitude, and (iii) phase. Selecting values of signal characteristics allows the artificial-reality device to direct (i.e., focus) sound in particular direction, such as to the user's left ear, the right ear, or both. In some embodiments, the characteristics for the signals are based on one or more HRTFs (discussed above).

(B4) In some embodiments of the method of any of B1-B3, the artificial-reality device further includes one or more acoustic sensors, and the method further includes, after generating the signals: (i) detecting at least some of the acoustic waves generated by the at least one lens, where the detected acoustic waves have a set of acoustic properties, (ii) determining whether the set of acoustic properties satisfies criteria associated with the audio data, and (iii) in accordance with a determination that the set of acoustic properties do not satisfy the criteria, adjusting the signals generated by the at least one transducer (e.g., adjust a value of at least one characteristic for the signals generated by the at least one transducer). In some embodiments, the set of acoustic properties includes one or more of pitch, duration, loudness, timbre, sonic texture, and spatial location. Furthermore, in some embodiments, the criteria associated with the audio data is a set of desired acoustic properties (i.e., desired values for one or more of pitch, duration, loudness, timbre, sonic texture, and spatial location).

(B5) In some embodiments of the method of any of B1-B4, generating the signals further includes generating other signals, via a second transducer of the one or more transducers, that vibrate a second lens of the head-mounted display. The second lens generates additional acoustic waves that correspond to the media presented by the head-mounted display when vibrated by the second transducer. In some embodiments, the additional acoustic waves are primarily heard by a first ear of the user and the acoustic waves are primarily heard by a second ear of the user. In some embodiments, the additional acoustic waves generated by the second lens have different acoustic properties relative to the acoustic properties of the acoustic waves generated by the at least one lens.

(B6) In some embodiments of B5, the method further includes selecting values of signal characteristics for the signals generated by the first and second transducers, which cause at least one of the acoustic waves generated by the at least one lens to constructively interfere with at least one of the additional acoustic waves generated by the second lens at a location near one of a user's ears.

(B7) In yet another aspect, one or more artificial-reality devices are provided and the one or more artificial-reality devices include means for performing any one of B1-B6.

(B8) In still another aspect, a non-transitory computer-readable storage medium is provided (e.g., as a memory device, such as external or internal storage, which is in communication with an artificial-reality device). The non-transitory computer-readable storage medium stores executable instructions that, when executed by an artificial-reality device with one or more processors/cores, cause the artificial-reality device to perform any one of B1-B6.

(B9) In another aspect, a system is provided that includes a computer (e.g., a neck band 205 as illustrated in FIG. 2) in communication with an artificial-reality device. The system is configured to perform any of B1-B6.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a better understanding of the various described embodiments, reference should be made to the Description of Embodiments below, in conjunction with the following drawings in which like reference numerals refer to corresponding parts throughout the figures and specification.

DESCRIPTION OF EMBODIMENTS

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first and second are used in some instances to describe various elements, these elements should not be limited by these terms. These terms are used only to distinguish one element from another. For example, a first transducer could be termed a second transducer, and, similarly, a second transducer could be termed a first transducer, without departing from the scope of the various described embodiments. The first transducer and the second transducer are both transducers, but they are not the same transducer.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, steps, operations, elements, and/or components, but do not preclude the presence or addition of one or more other features, steps, operations, elements, components, and/or groups thereof.

As used herein, the term "if" means "when," "upon," "in response to determining," "in response to detecting," or "in accordance with a determination that," depending on the context. Similarly, the phrase "if it is determined" or "if [a stated condition or event] is detected" means "upon determining," "in response to determining," "upon detecting [the stated condition or event]," "in response to detecting [the stated condition or event]" or "in accordance with a determination that [a stated condition or event] is detected," depending on the context.

As used herein, the term "exemplary" is used in the sense of "serving as an example, instance, or illustration" and not in the sense of "representing the best of its kind."

Figure 1:
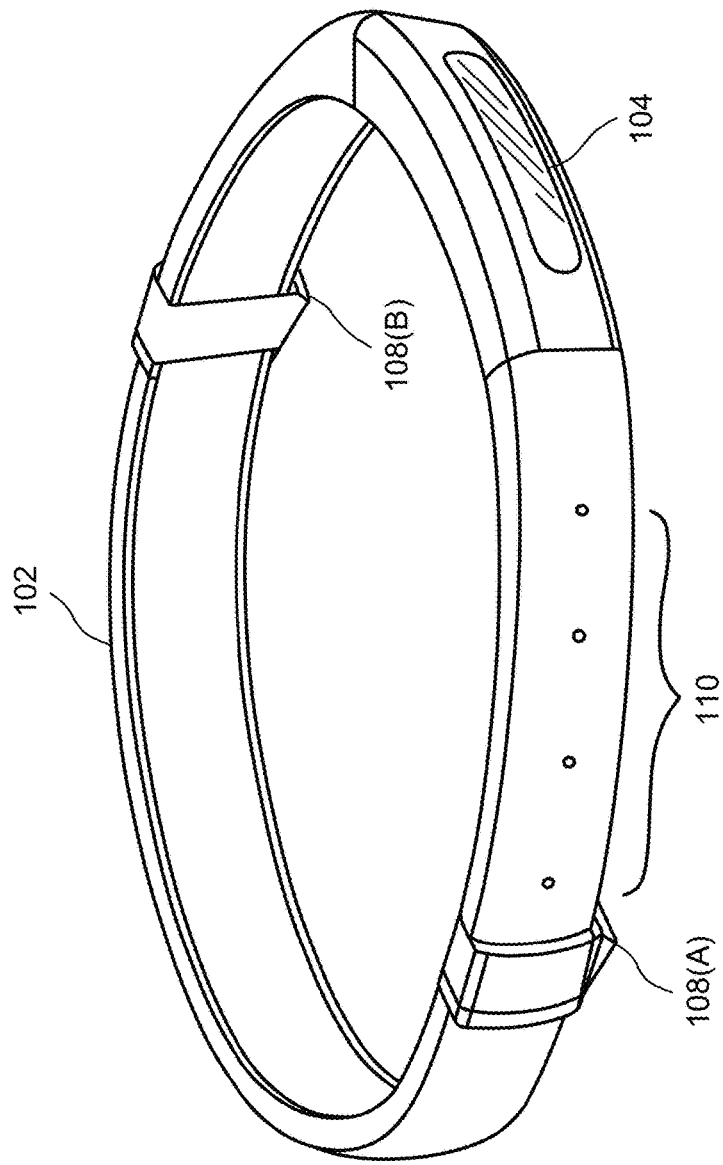
FIG. 1 illustrates an embodiment of an artificial-reality device.
Figure 2:
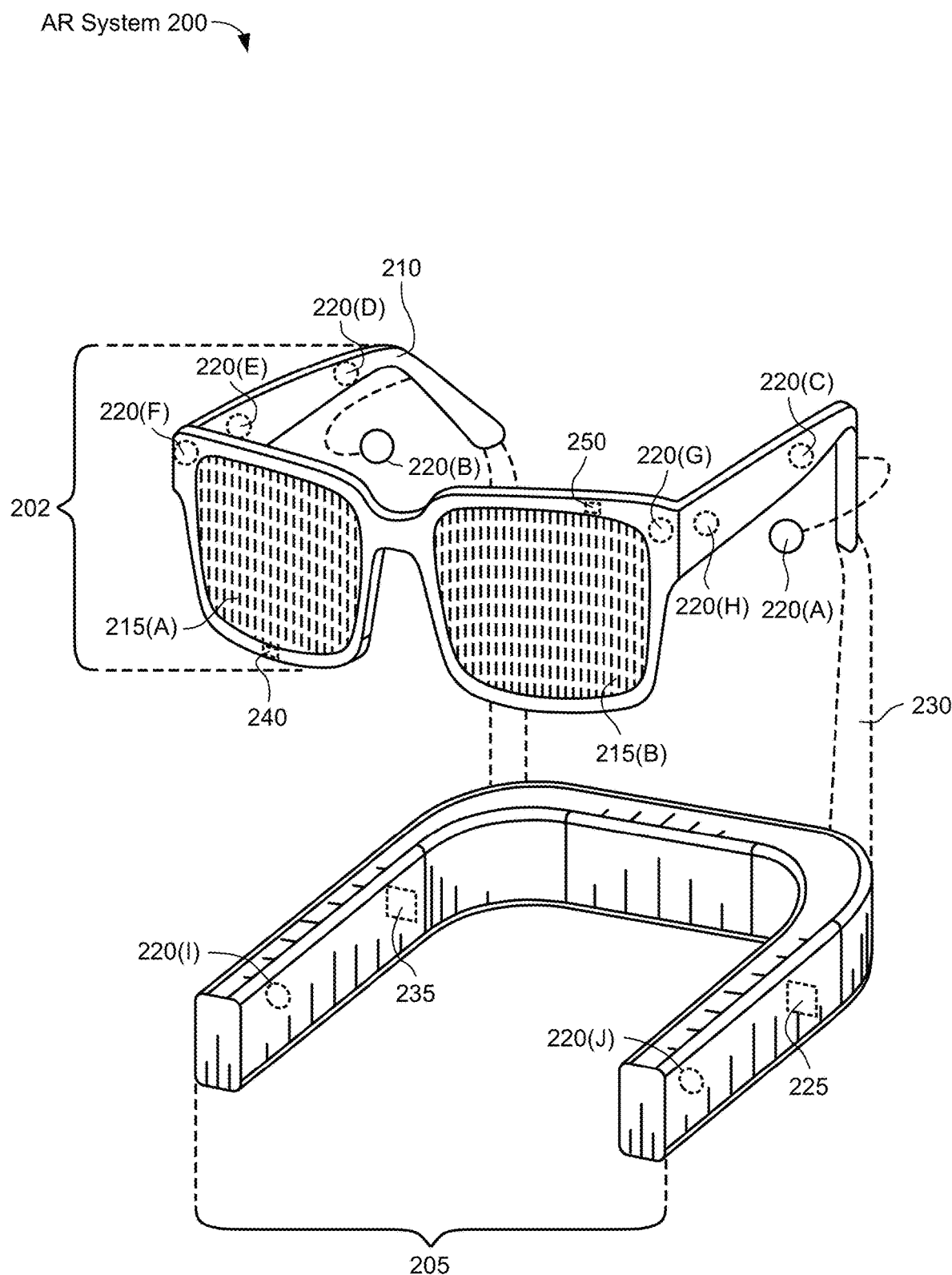
FIG. 2 illustrates an embodiment of an augmented-reality headset and a corresponding neckband.
Figure 3:
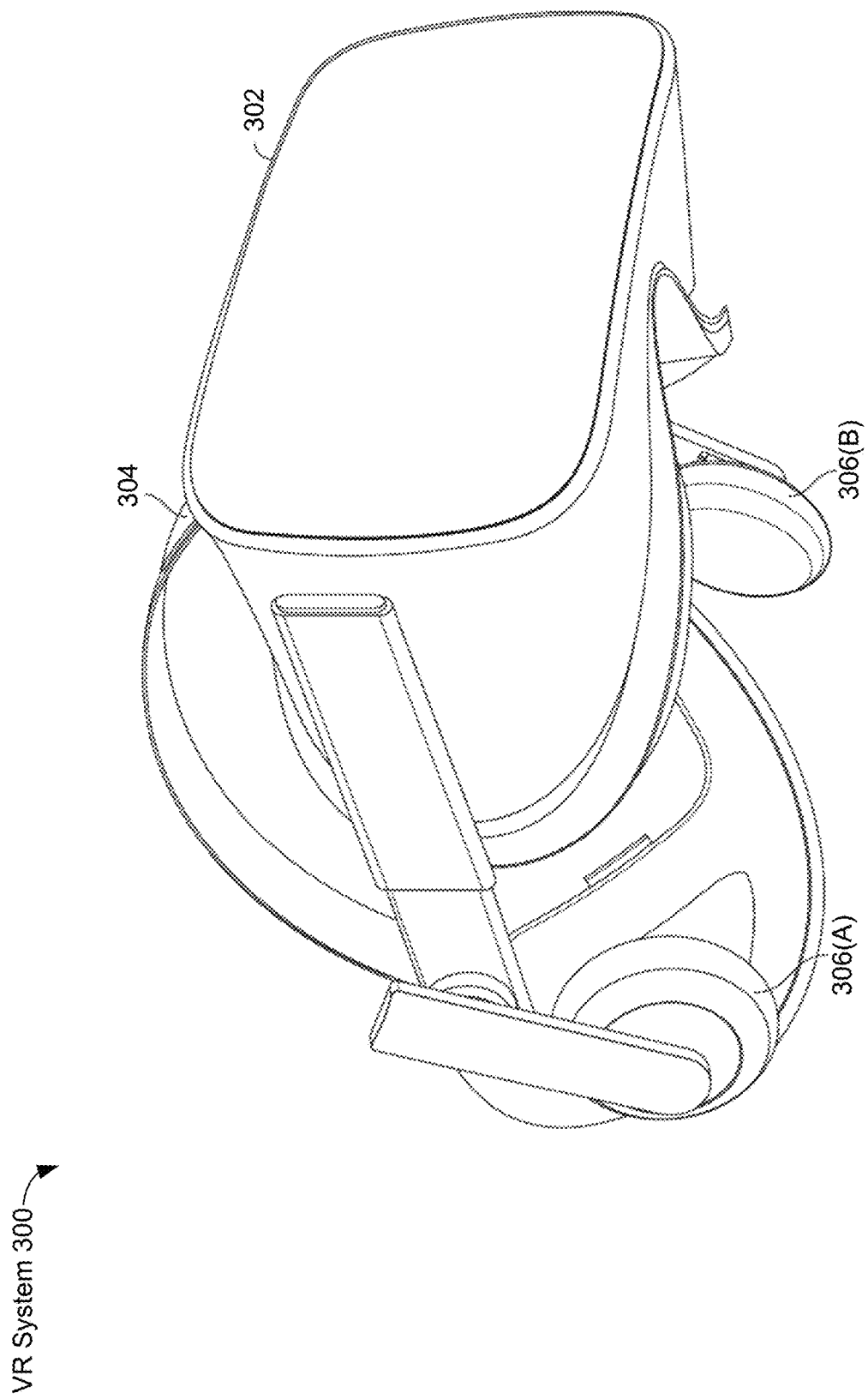
FIG. 3 illustrates an embodiment of a virtual-reality headset.

The following provides, with reference to FIGS. 1-3, detailed descriptions of various types of artificial-reality devices, which may facilitate and/or contribute to a user's artificial reality experience. Detailed descriptions of example apparatuses and/or systems that implement directional audio playback (e.g., using one or more transducers coupled to the example artificial-reality devices) are described in connection with FIGS. 4A-6. Detailed descriptions of example acoustic simulations created by the example artificial-reality devices are described in connection with FIGS. 7A-12D. In addition, the discussion corresponding to FIG. 13 provides detailed descriptions of an example method for audio generation in an artificial-reality device.

Embodiments of this disclosure may include or be implemented in conjunction with various types of artificial-reality systems. "Artificial reality" constitutes any form of reality that has been altered by virtual objects for presentation to a user. Such artificial reality may include and/or represent virtual reality (VR), augmented reality (AR), mixed reality (MR), hybrid reality, or some combination and/or variation of one or more of the these. Artificial-reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect for a viewer). In some embodiments, artificial reality may also be associated with applications, products, accessories, services, or some combination thereof, which are used, for example, to create content in an artificial reality and/or are otherwise used in (e.g., to perform activities in) an artificial reality.

Artificial-reality systems may be implemented in a variety of different form factors and configurations. Some artificial reality systems are designed to work without near-eye displays (NEDs), such as the AR system 100 in FIG. 1. Other artificial reality systems include an NED, which provides visibility into the real world (e.g., the AR system 200 in FIG. 2) or that visually immerses a user in an artificial reality (e.g., the VR system 300 in FIG. 3). While some artificial reality devices are self-contained systems, other artificial reality devices communicate and/or coordinate with external devices to provide an artificial reality experience to a user. Examples of such external devices include handheld controllers, mobile devices, desktop computers, devices worn by a user, devices worn by one or more other users, and/or any other suitable external system.

FIGS. 1-3 provide examples of artificial-reality devices. The AR system 100 in FIG. 1 generally represents a wearable device dimensioned to fit about a body part of a user. As shown, the AR system 100 includes a frame 102 (e.g., a band) and a camera assembly 104, which is coupled to the frame 102 and configured to gather information about a local environment by observing the local environment. The AR system 100 may also include one or more transducers. In one example, the AR system 100 includes output transducers 108(A) and 108(B) and input transducers 110. The output transducers 108(A) and 108(B) may provide audio feedback, haptic feedback, and/or content to a user, and the input audio transducers may capture audio (or other signals/waves) in a user's environment.

Thus, the AR system 100 does not include a near-eye display (NED) positioned in front of a user's eyes. AR systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While the AR system 100 may not include an NED, the AR system 100 may include other types of screens or visual feedback devices (e.g., a display screen integrated into a side of the frame 102).

The embodiments discussed in this disclosure may also be implemented in AR systems that include one or more NEDs. For example, as shown in FIG. 2, the AR system 200 may include an eyewear device 202 with a frame 210 configured to hold a left display device 215(A) and a right display device 215(B) in front of a user's eyes (the left and right display are also referred to herein as a "left lens" and a "right lens"). The display devices 215(A) and 215(B) may act together or independently to present an image or series of images to a user. While the AR system 200 includes two displays, embodiments of this disclosure may be implemented in AR systems with a single NED or more than two NEDs.

In some embodiments, the AR system 200 includes one or more sensors, such as the sensors 240 and 250. The sensors 240 and 250 may generate measurement signals in response to motion of the AR system 200 and may be located on substantially any portion of the frame 210. Each sensor may be a position sensor, an inertial measurement unit (IMU), a depth camera assembly, or any combination thereof. The AR system 200 may include zero or more sensors. In embodiments in which the sensors include an IMU, the IMU may generate calibration data based on measurement signals from the sensors. Examples of the sensors include, without limitation, accelerometers, gyroscopes, magnetometers, other suitable types of sensors that detect motion, sensors used for error correction of the IMU, or some combination thereof. Sensors are also discussed above with reference to FIG. 1.

The AR system 200 may also include a microphone array with a plurality of acoustic sensors 220(A)-220(J), referred to collectively as the acoustic sensors 220. The acoustic sensors 220 may detect air pressure variations induced by sound waves. Each acoustic sensor 220 may be configured to detect sound and convert the detected sound into an electronic format (e.g., an analog or digital format). The microphone array in FIG. 2 may include, for example, ten acoustic sensors: 220(A) and 220(B), which may be designed to be placed inside a corresponding ear of the user, acoustic sensors 220(C), 220(D), 220(E), 220(F), 220(G), and 220(H), which may be positioned at various locations on the frame 210, and/or acoustic sensors 220(I) and 220(J), which may be positioned on a corresponding neckband 205.

The configuration of the acoustic sensors 220 of the microphone array may vary. While the AR system 200 is shown in FIG. 2 having ten acoustic sensors 220, the number of acoustic sensors 220 may be greater or less than ten. In some embodiments, using more acoustic sensors 220 may increase the amount of audio information collected and/or the sensitivity and accuracy of the audio information. In contrast, using a lower number of acoustic sensors 220 may decrease the computing power required by a controller 225 to process the collected audio information. In addition, the position of each acoustic sensor 220 of the microphone array may vary. For example, the position of an acoustic sensor 220 may include a defined position on the user, a defined coordinate on the frame 210, an orientation associated with each acoustic sensor, or some combination thereof.

The acoustic sensors 220(A) and 220(B) may be positioned on different parts of the user's ear, such as behind the pinna or within the auricle or fossa. Or, there may be additional acoustic sensors on or surrounding the ear in addition to acoustic sensors 220 inside the ear canal (e.g., as shown in FIG. 5). Having an acoustic sensor positioned next to an ear canal of a user may enable the microphone array to collect information on how sounds arrive at the ear canal. By positioning at least two of the acoustic sensors 220 on either side of a user's head (e.g., as binaural microphones), the AR device 200 may simulate binaural hearing and capture a 3D stereo sound field around about a user's head (e.g., capture 3D stereo sound generated by the right display 215(A) and/or the left display 215(B), as discussed below in connection with FIGS. 4A-4C). In some embodiments, the acoustic sensors 220(A) and 220(B) may be connected to the AR system 200 via a wired connection, and in other embodiments, the acoustic sensors 220(A) and 220(B) may be connected to the AR system 200 via a wireless connection (e.g., a Bluetooth connection). In still other embodiments, the acoustic sensors 220(A) and 220(B) may not be used at all in conjunction with the AR system 200.

The acoustic sensors 220 on the frame 210 may be positioned along the length of the temples, across the bridge, above or below the display devices 215(A) and 215(B), or some combination thereof. The acoustic sensors 220 may be oriented such that the microphone array is able to detect sounds in a wide range of directions surrounding the user wearing AR system 200. In some embodiments, an optimization process may be performed during manufacturing of the AR system 200 to determine relative positioning of each acoustic sensor 220 in the microphone array.

The AR system 200 may further include one or more transducers 402 (e.g., mechanical oscillators), as shown in FIGS. 4A-4C and 5, which may be collectively referred to as a transducer array. In some embodiments, each transducer 402 includes, hardware capable of generating signals (e.g., mechanical waves such as soundwaves, ultrasound waves, or other waves and signals, such as electromagnetic waves). For example, each transducer 402 can convert electrical signals into audio waves (or various other waves). The transducers 402 may be miniature piezoelectric transducers, capacitive transducers, single or multipole voice coil motors, and/or any other suitable device for creation of signals. As explained below in connection with FIGS. 4A-4C and 5, the one or more transducers 402 are configured to generate signals that vibrate one or more of the frame 210, the right display 215(A), and the left display 215(B).

The AR system 200 may further include or be connected to an external device (e.g., a paired device), such as a neckband 205. As shown, the neckband 205 may be coupled to the eyewear device 202 via one or more connectors 230. The connectors 230 may be wired or wireless connectors and may include electrical and/or non-electrical (e.g., structural) components. In some cases, the eyewear device 202 and the neckband 205 may operate independently without any wired or wireless connection between them. While FIG. 2 illustrates the components of the eyewear device 202 and the neckband 205 in example locations on the eyewear device 202 and the neckband 205, the components may be located elsewhere and/or distributed differently on the eyewear device 202 and/or the neckband 205. In some embodiments, the components of the eyewear device 202 and the neckband 205 may be located on one or more additional peripheral devices paired with the eyewear device 202, the neckband 205, or some combination thereof. Furthermore, the neckband 205 generally represents any type or form of paired device. Thus, the following discussion of neckband 205 also applies to various other paired devices, such as smart watches, smart phones, wrist bands, other wearable devices, hand-held controllers, tablet computers, or laptop computers.

Pairing external devices, such as a neckband 205, with AR eyewear devices may enable the eyewear devices to achieve the form factor of a pair of glasses while still providing sufficient battery and computation power for expanded capabilities. Some or all of the battery power, computational resources, and/or additional features of the AR system 200 may be provided by a paired device or shared between a paired device and an eyewear device, thus reducing the weight, heat profile, and form factor of the eyewear device overall while still retaining desired functionality. For example, the neckband 205 may allow components that would otherwise be included on an eyewear device to be included in the neckband 205 because users may tolerate a heavier weight load on their shoulders than they would tolerate on their heads. The neckband 205 may also have a larger surface area over which to diffuse and disperse heat to the ambient environment. Thus, the neckband 205 may allow for greater battery and computation capacity than might otherwise have been possible on a stand-alone eyewear device. Because weight carried in the neckband 205 may be less invasive to a user than weight carried in the eyewear device 202, a user may tolerate wearing a lighter eyewear device and carrying or wearing the paired device for greater lengths of time than the user would tolerate wearing a heavy standalone eyewear device, thereby enabling an artificial reality environment to be incorporated more fully into a user's day-to-day activities.

The neckband 205 may be communicatively coupled with the eyewear device 202 and/or to other devices. The other devices may provide certain functions (e.g., tracking, localizing, depth mapping, processing, or storage) to the AR system 200. In the embodiment of FIG. 2, the neckband 205 includes two acoustic sensors 220(I) and 220(J), which are part of the microphone array (or potentially form their own microphone subarray). The neckband 205 may also include a controller 225 and a power source 235.

The acoustic sensors 220(I) and 220(J) of the neckband 205 may be configured to detect sound and convert the detected sound into an electronic format (analog or digital). In the embodiment of FIG. 2, the acoustic sensors 220(I) and 220(J) are positioned on the neckband 205, thereby increasing the distance between neckband acoustic sensors 220(I) and 220(J) and the other acoustic sensors 220 positioned on the eyewear device 202. In some cases, increasing the distance between the acoustic sensors 220 of the microphone array improves the accuracy of beamforming performed via the microphone array. For example, if a sound is detected by the acoustic sensors 220(C) and 220(D) and the distance between acoustic sensors 220(C) and 220(D) is greater than, for example, the distance between the acoustic sensors 220(D) and 220(E), the determined source location of the detected sound may be more accurate than if the sound had been detected by the acoustic sensors 220(D) and 220(E).

The controller 225 of the neckband 205 may process information generated by the sensors on the neckband 205 and/or the AR system 200. For example, the controller 225 may process information from the microphone array, which describes sounds detected by the microphone array. For each detected sound, the controller 225 may perform a direction of arrival (DOA) estimation to estimate a direction from which the detected sound arrived at the microphone array. As the microphone array detects sounds, the controller 225 may populate an audio data set with the information (e.g., which may be used to adjust operation of the transducers 402). In embodiments in which the AR system 200 includes an IMU, the controller 225 may compute all inertial and spatial calculations from the IMU located on the eyewear device 202. The connector 230 may convey information between the AR system 200 and the neckband 205 and between the AR system 200 and the controller 225. The information may be in the form of optical data, electrical data, wireless data, or any other transmittable data form. Moving the processing of information generated by the AR system 200 to the neckband 205 may reduce weight and heat in the eyewear device 202, making it more comfortable to a user.

The power source 235 in the neckband 205 may provide power to the eyewear device 202 and/or to the neckband 205. The power source 235 may include, without limitation, lithium-ion batteries, lithium-polymer batteries, primary lithium batteries, alkaline batteries, or any other form of power storage. In some cases, the power source 235 is a wired power source. Including the power source 235 on the neckband 205 instead of on the eyewear device 202 may help better distribute the weight and heat generated by the power source 235.

As noted, some artificial reality systems may, instead of blending an artificial reality with actual reality, substantially replace one or more of a user's sensory perceptions of the real world with a virtual experience. One example of this type of system is a head-worn display system, such as the VR system 300 in FIG. 3, which mostly or completely covers a user's field of view. The VR system 300 may include a front rigid body 302 and a band 304 shaped to fit around a user's head. The VR system 300 may also include output audio transducers 306(A) and 306(B). Furthermore, while not shown in FIG. 3, the front rigid body 302 may include one or more electronic elements, including one or more electronic displays, one or more IMUs, one or more tracking emitters or detectors, and/or any other suitable device or system for creating an artificial reality experience. Another VR system 600 is provided at FIG. 6, which does not include output audio transducers 306(A) and 306(B), and instead includes one or more transducers 402 (e.g., mechanical oscillators) coupled to a display (or displays) of the VR system 600. The one or more transducers are configured to vibrate the display (or displays) such that the display (or displays) act as a diaphragm (or diaphragms) of an audio device.

Artificial-reality systems may include a variety of types of visual feedback mechanisms. For example, display devices in the AR system 200 and/or the VR system 300 may include one or more liquid-crystal displays (LCDs), light emitting diode (LED) displays, organic LED (OLED) displays, and/or any other suitable type of display screen. Artificial-reality systems may include a single display screen for both eyes or may provide a display screen for each eye, which may allow for additional flexibility for varifocal adjustments or for correcting a user's refractive error. Some artificial reality systems also include optical subsystems having one or more lenses (e.g., conventional concave or convex lenses, Fresnel lenses, or adjustable liquid lenses) through which a user may view a display screen.

In addition to or instead of using display screens, some artificial reality systems include one or more projection systems. For example, display devices in the AR system 200 and/or the VR system 300 may include micro-LED projectors that project light (e.g., using a waveguide) into display devices, such as clear combiner lenses, which allow ambient light to pass through. The display devices may refract the projected light toward a user's pupil and may enable a user to simultaneously view both artificial reality content and the real world. Artificial-reality systems may also be configured with any other suitable type or form of image projection system.

Artificial-reality systems may also include various types of computer vision components and subsystems. For example, the AR system 100, the AR system 200, and/or the VR system 300 may include one or more optical sensors such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

Artificial-reality systems may also include one or more input and/or output audio transducers. In the examples shown in FIGS. 1 and 3, the output audio transducers 108(A), 108(B), 306(A), and 306(B) may include voice coil speakers, ribbon speakers, electrostatic speakers, piezoelectric speakers, bone conduction transducers, cartilage conduction transducers, and/or any other suitable type or form of audio transducer. Similarly, the input audio transducers 110 may include condenser microphones, dynamic microphones, ribbon microphones, and/or any other type or form of input transducer. In some embodiments, a single transducer may be used for both audio input and audio output. In the examples shown in FIGS. 4A to 6, transducers (e.g., voice coils, piezoelectrics, and the like) are coupled to the displays of AR/VR systems, and the transducers transform the displays into output audio devices (i.e., speakers).

The artificial-reality systems shown in FIGS. 1-3 may include tactile (i.e., haptic) feedback systems, which may be incorporated into headwear, gloves, body suits, handheld controllers, environmental devices (e.g., chairs or floormats), and/or any other type of device or system. Additionally, in some embodiments, the haptic feedback systems may be incorporated with the artificial reality systems. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms, as described herein. Haptic feedback systems may be implemented independently of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, or business enterprises), entertainment purposes (e.g., for playing video games, listening to music, or watching video content), and/or for accessibility purposes (e.g., as hearing aids or vision aids). The embodiments disclosed herein may enable or enhance a user's artificial reality experience in one or more of these contexts and environments and/or in other contexts and environments.

Some AR systems may map a user's environment using techniques referred to as "simultaneous location and mapping" (SLAM). SLAM identifying techniques may involve a variety of hardware and software tools that can create or update a map of an environment while simultaneously keeping track of a device's or a user's location and/or orientation within the mapped environment. SLAM may use many different types of sensors to create a map and determine a device's or a user's position within the map.

SLAM techniques may, for example, implement optical sensors to determine a device's or a user's location, position, or orientation. Radios, including Wi-Fi, Bluetooth, global positioning system (GPS), cellular or other communication devices may also be used to determine a user's location relative to a radio transceiver or group of transceivers (e.g., a Wi-Fi router or group of GPS satellites). Acoustic sensors such as microphone arrays or 2D or 3D sonar sensors may also be used to determine a user's location within an environment. AR and VR devices (such as the systems 100, 200, and 300) may incorporate any or all of these types of sensors to perform SLAM operations such as creating and continually updating maps of a device's or a user's current environment. In at least some of the embodiments described herein, SLAM data generated by these sensors may be referred to as "environmental data" and may indicate a device's or a user's current environment. This data may be stored in a local or remote data store (e.g., a cloud data store) and may be provided to a user's AR/VR device on demand.

When the user is wearing an AR headset or VR headset in a given environment, the user may be interacting with other users or other electronic devices that serve as audio sources (also called "sound sources" herein). In some cases, it may be desirable to determine where the audio sources are located relative to the user and then present the audio sources to the user as if they were coming from the location of the audio source. The process of determining where the audio sources are located relative to the user may be referred to herein as "localization," and the process of rendering playback of the audio source signal (e.g., using the one or more transducers 402) to appear as if it is coming from a specific direction may be referred to herein as "spatialization."

Localizing an audio source may be performed in a variety of different ways. In some cases, an AR or VR headset may initiate a Direction of Arrival ("DOA") analysis to determine the location of a sound source. The DOA analysis may include analyzing the intensity, spectra, and/or arrival time of each sound at the AR/VR device to determine the direction from which the sound originated. In some cases, the DOA analysis may include any suitable algorithm for analyzing the surrounding acoustic environment in which the artificial reality device is located.

For example, the DOA analysis may be designed to receive input signals from a microphone (or microphones) and apply digital signal processing algorithms to the input signals to estimate the direction of arrival. These algorithms may include, for example, delay and sum algorithms where the input signal is sampled, and the resulting weighted and delayed versions of the sampled signal are averaged together to determine a direction of arrival. A least mean squared (LMS) algorithm may also be implemented to create an adaptive filter. This adaptive filter may then be used to identify differences in signal intensity, for example, or differences in time of arrival. These differences may then be used to estimate the direction of arrival. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct-path audio signal. Those bins having a portion of the direct-path signal may then be analyzed to identify the angle at which a microphone array received the direct-path audio signal. The determined angle may then be used to identify the direction of arrival for the received input signal. Other algorithms not listed above may also be used alone or in combination with the above algorithms to determine DOA.

In some embodiments, different users may perceive the source of a sound as coming from slightly different locations. This may be the result of each user having a unique head-related transfer function (HRTF), which may be dictated by a user's anatomy, including ear canal length and the positioning of the ear drum. The artificial-reality device may provide an alignment and orientation guide, which the user may follow to customize the sound signal presented to the user based on a personal HRTF. In some embodiments, an AR or VR device may implement one or more microphones to listen to sounds within the user's environment. The AR or VR device may use a variety of different array transfer functions (ATFs) (e.g., any of the DOA algorithms identified above) to estimate the direction of arrival for the sounds. Once the direction of arrival has been determined, the artificial reality device may play back sounds (e.g., using the one or more transducers 402, as explained below) to the user according to the user's unique HRTF. Accordingly, the DOA estimation generated using an ATF may be used to determine the direction from which the sounds are to be played from. The playback sounds may be further refined based on how that specific user hears sounds according to the HRTF (i.e., characteristics of signals generated by the one or more transducers may be based in part on the user's unique HRTF).

In addition to or as an alternative to performing a DOA estimation, an artificial-reality device may perform localization based on information received from other types of sensors. These sensors may include cameras, infrared radiation (IR) sensors, heat sensors, motion sensors, global positioning system (GPS) receivers, or sensors that detect a user's eye movements. For example, an artificial-reality device may include an eye tracker or gaze detector that determines where a user is looking. Often, a user's eyes look at the source of a sound, if only briefly. Such clues provided by the user's eyes may further aid in determining the location of a sound source. Other sensors, such as cameras, heat sensors, and IR sensors, may also indicate the location of a user, the location of an electronic device, or the location of another sound source. Any or all of the above methods may be used individually or in combination to determine the location of a sound source and may further be used to update the location of a sound source over time.

Some embodiments implement the determined DOA to generate a more customized output audio signal for the user. For instance, an acoustic transfer function may characterize or define how a sound is received from a given location. More specifically, an acoustic transfer function may define the relationship between parameters of a sound at its source location and the parameters by which the sound signal is detected (e.g., detected by a microphone array or detected by a user's ear). An artificial-reality device may include one or more acoustic sensors that detect sounds within range of the device. A controller of the artificial reality device may estimate a DOA for the detected sounds (e.g., using any of the methods identified above) and, based on the parameters of the detected sounds, may generate an acoustic transfer function that is specific to the location of the device. This customized acoustic transfer function may thus be used to generate a spatialized output audio signal where the sound is perceived as coming from a specific location.

Once the location of the sound source or sources is known, the artificial-reality device may re-render (i.e., spatialize) the sound signals to sound as if coming from the direction of that sound source (e.g., by activating one or more transducers 402, which in turn vibrate the right display 215(A) and/or the left display 215(B), thereby turning the display 215 into a speaker diaphragm). The artificial-reality device may apply filters or other digital signal processing that alter the intensity, spectra, or arrival time of the sound signal. The digital signal processing may be applied in such a way that the sound signal is perceived as originating from the determined location. The artificial-reality device may amplify or subdue certain frequencies or change the time that the signal arrives at each ear. In some cases, the artificial-reality device may create an acoustic transfer function that is specific to the location of the device and the detected direction of arrival of the sound signal. In some embodiments, the artificial-reality device may re-render the source signal in a stereo device or multi-speaker device. In such cases, separate and distinct audio signals may be sent to different transducers, thereby turning the right display 215(A) and the left display 215(B) into distinct speakers. Each of these audio signals may be altered according to a user's HRTF and according to measurements of the user's location and the location of the sound source so that the generated sound appears to be coming from the determined location of the sound source (e.g., the right display 215(A) and/or the left display 215(B) may be vibrated in such a manner so that they direct acoustic waves to one of the user's ears and not the other ear, or direct acoustic waves to each of the user's ears but at different intensities). Accordingly, in this manner, the artificial-reality device may re-render an audio signal to sound as if originating from a specific location.

The artificial reality systems described above in connection with FIGS. 1-3 may also include memory (e.g., the neckband 205 in FIG. 2 may include memory). The memory may be high-speed random access memory, such as DRAM, SRAM, DDR SRAM, or other random access solid state memory devices. In some embodiments, the memory includes non-volatile memory, such as one or more magnetic disk storage devices, one or more optical disk storage devices, one or more flash memory devices, or one or more other non-volatile solid state storage devices. The memory, or alternatively the non-volatile memory within the memory, includes a non-transitory computer-readable storage medium. In some embodiments, the memory, or the non-transitory computer-readable storage medium of the memory stores the following programs, modules, and data structures, or a subset or superset thereof:

operating logic, including procedures for handling various basic system services and for performing hardware dependent tasks;

a communication module for coupling to and/or communicating with other devices (e.g., an artificial-reality headset, remote server, or other artificial-realty system) in conjunction with a communication interface (wired or wireless interface);

an artificial-reality generation module, which is used for generating artificial-reality images and sending corresponding video and audio data to the headset and transducers 402. In some embodiments, the artificial-reality generation module is a virtual-reality generation module, an augmented-reality generation module, a mixed-reality generation module, or some combination thereof;

an HRTF generation module, which is used for computing HRTF filters based on sound profiles (e.g., energy contributions) of audio sources;

an audio output module, which is used for convolving the computed HRTF filters with dry input sound to produce final audio data;

a signal generating module, which generates signals (e.g., in conjunction with transducers 402 and the audio output module) signals. In some embodiments, the signal generating module includes a characteristics selection module, which is used for selecting values of signals characteristics for signals generated by the transducers 402;

a display module, which is used for displaying media (e.g., virtual-reality images, augmented-reality images, and/or mixed-reality images) in conjunction with the headset; and one or more databases, which store data, including:
spherical harmonic HRTF coefficients;
artificial-reality applications;
communication protocol information for storing and managing protocol information for one or more protocols (e.g., custom or standard wireless protocols, such as ZigBee or Z-Wave, and/or custom or standard wired protocols, such as Ethernet); and
parameters describing anatomical features of one or more users.

In some embodiments, the memory also includes a feature identification module, which receives images of the user captured by a camera and identifies a set of anatomical features from the images, which describe physical characteristics of a user relevant to the user's HRTF. The set of anatomical features may include, for example, the head diameter, shoulder width, height, and shape and size of the pinnae. The anatomical features may be identified through any image processing or analysis algorithm.

In some embodiments, the artificial-reality applications are implemented as software modules, which are stored on the storage device and executed by the processor. Each artificial-reality application is a group of instructions that, when executed by a processor of the artificial reality system, generates artificial-reality content (e.g., images, audio, or haptic feedback) for presentation to the user. An artificial-reality application may generate artificial-reality content in response to inputs received from the user via movement of the headset.

Each of the above identified elements may be stored in one or more of the previously mentioned memory devices, and corresponds to a set of instructions for performing the function(s) described. The above identified modules or programs (e.g., sets of instructions) need not be implemented as separate software programs, procedures, or modules, and thus various subsets of these modules can be combined or otherwise rearranged in various embodiments. In some embodiments, the memory stores a subset of the modules and data structures identified above.

The artificial-reality systems described above in connection with FIGS. 1-3 may facilitate and/or contribute to artificial-reality experiences for users. As described in greater detail below in connection with FIGS. 4-6, the artificial-reality systems described above may further include one or more transducers, which allow displays (e.g., lenses) of the artificial-reality systems to create acoustic waves (i.e., 3D sound) corresponding to the displayed digital content. In doing so, the artificial-reality systems discussed below do not include distinct audio output devices, such as speakers placed in or on a user's ears (e.g., as shown in FIG. 3).

First Embodiment—Augmented-Reality Headset

Figure 4A:
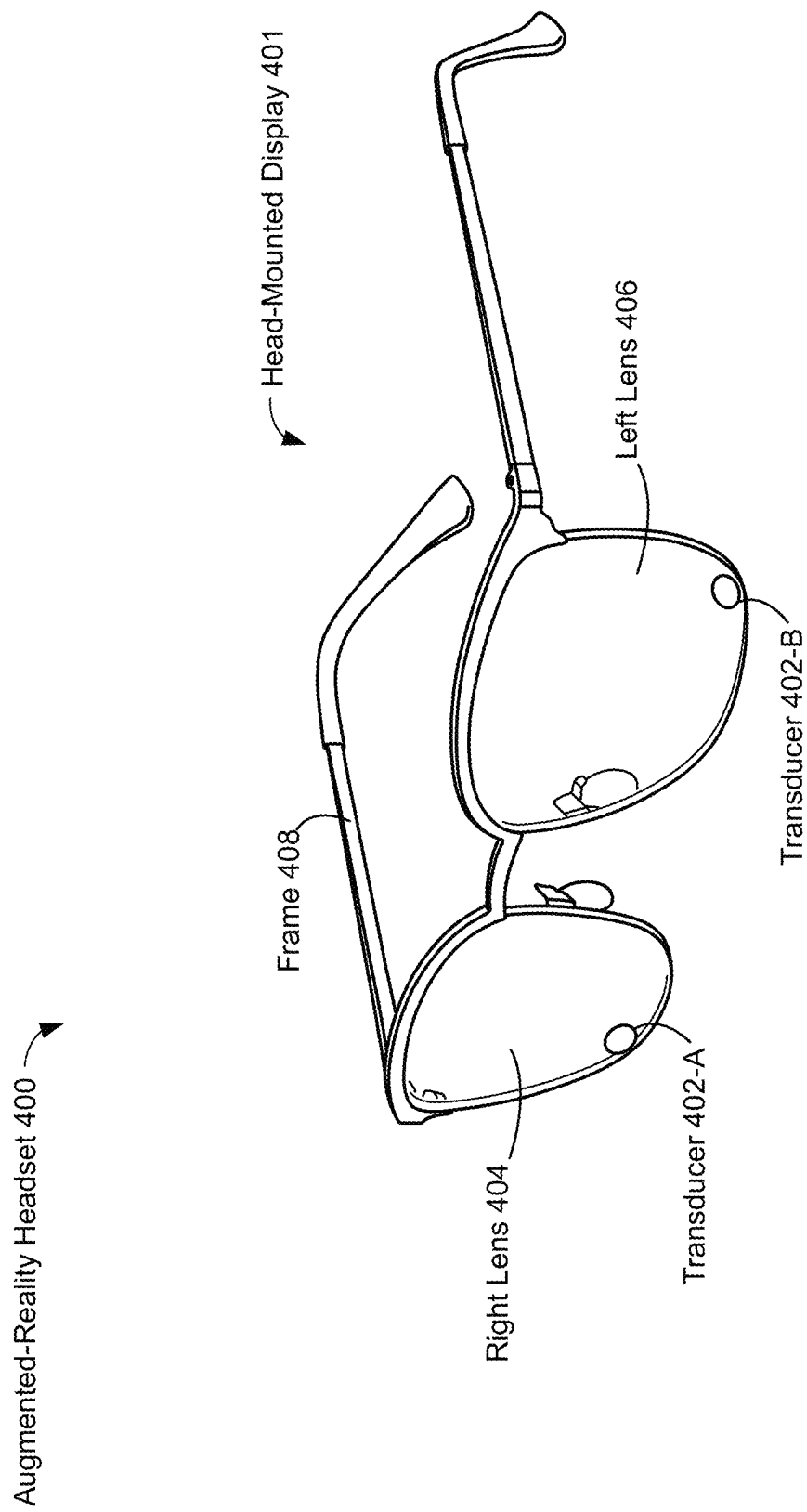
FIG. 4A illustrates an embodiment of an augmented-reality headset with a plurality of transducers in accordance with some embodiments.
Figure 4B:
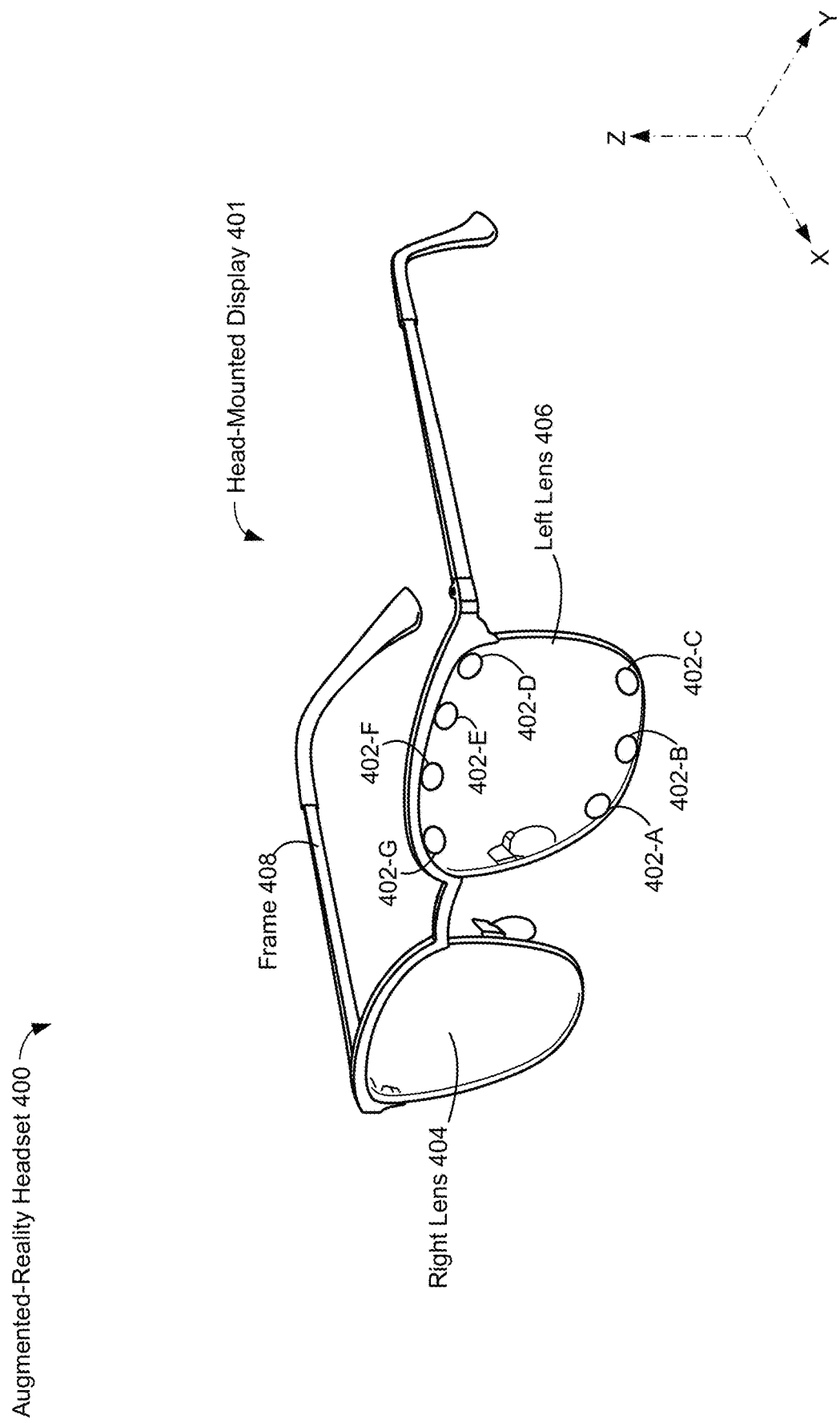
FIG. 4B illustrates an embodiment of an augmented-reality headset with a plurality of transducers in accordance with some embodiments.
Figure 4C:
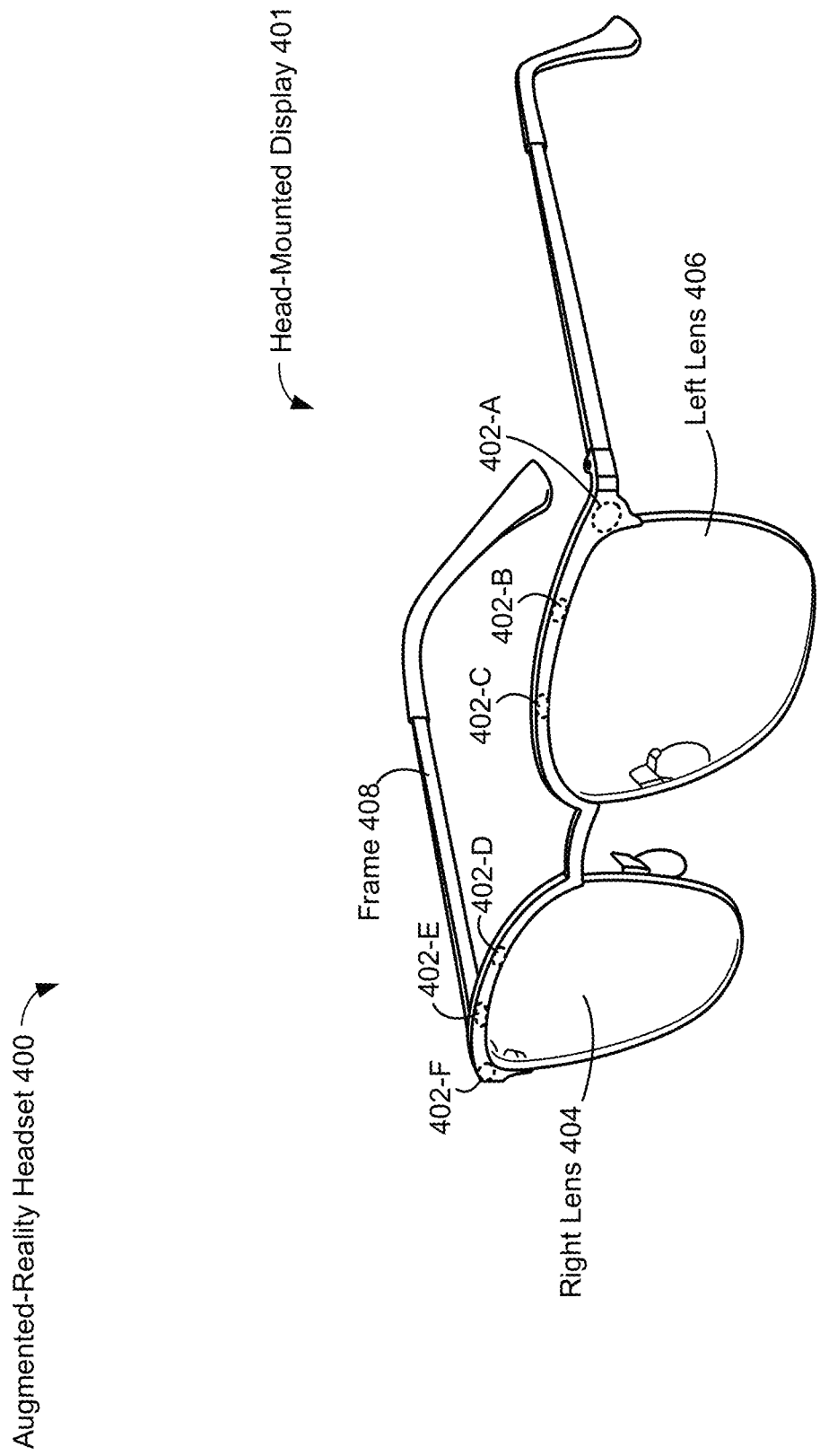
FIG. 4C illustrates an embodiment of an augmented-reality headset with a plurality of transducers in accordance with some embodiments.
Figure 5:
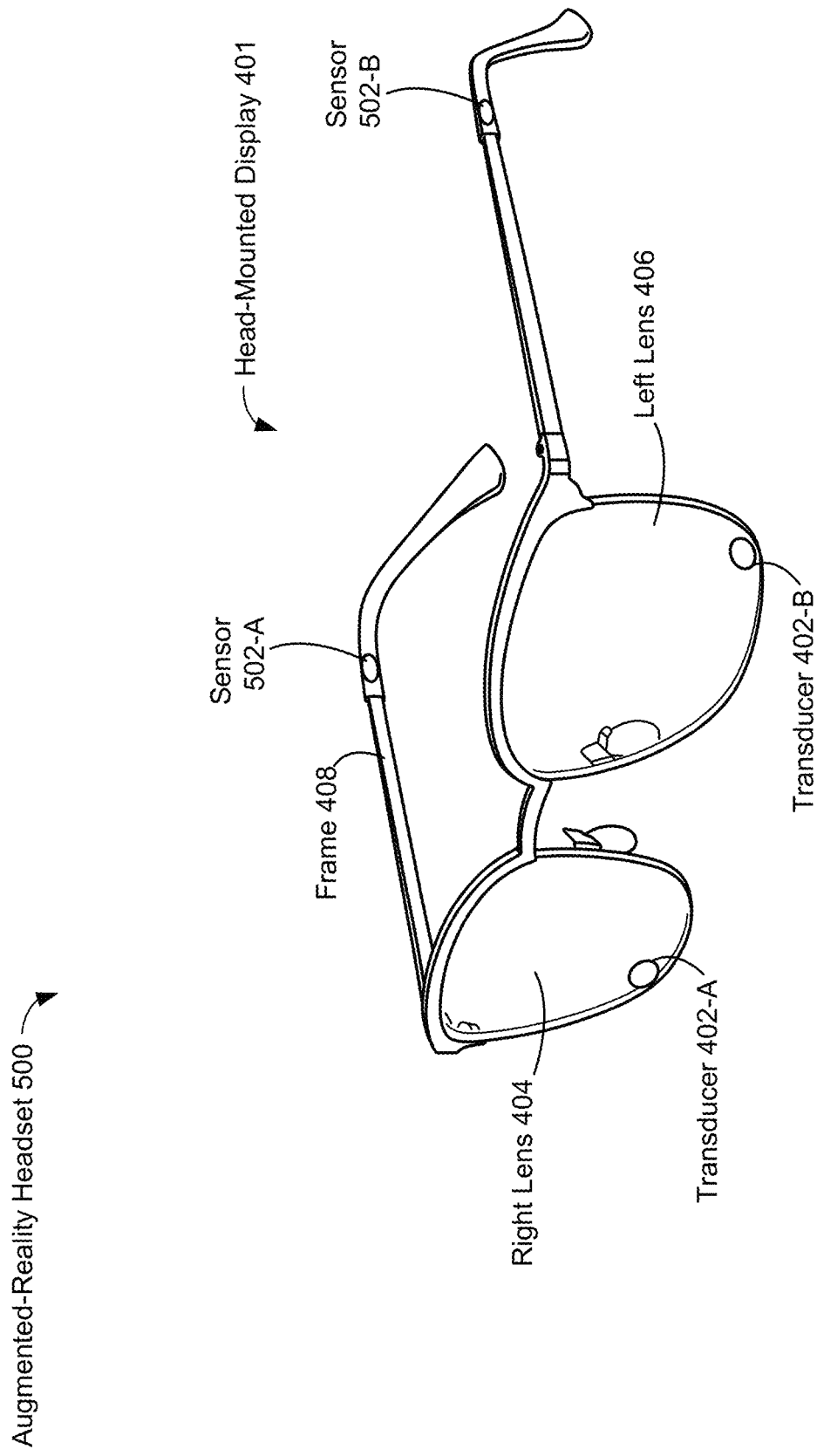
FIG. 5 illustrates an embodiment of an augmented-reality headset with a plurality of transducers and sensors in accordance with some embodiments.

FIGS. 4A-4C illustrate embodiments of example augmented-reality headsets 400 (also referred to herein as "augmented-reality systems" or "augmented-reality devices"). The example augmented-reality headsets 400 are examples of the AR system 200 in FIG. 2. Importantly, the augmented-reality headsets 400 in FIGS. 4A-4C each includes a plurality of transducers 402 for creating audio playback. The components in FIGS. 4A-4C are illustrated in particular arrangements for ease of illustration and one skilled in the art will appreciate that other arrangements are possible. Moreover, while some example features are illustrated, various other features have not been illustrated for the sake of brevity and so as not to obscure pertinent aspects of the example implementations disclosed herein. For example, the augmented-reality headsets 400 in FIGS. 4A-4C may further include or be connected to an external device (e.g., a paired device), such as the neckband 205 in FIG. 2. The external device may include, among other things, one or more processors (e.g., controllers) for operating the plurality of transducers 402 (e.g., activating transducers and determining appropriate characteristics for signals generated by the activated transducers).

For example, a representative augmented-reality headset 400 includes a head-mounted display 401 configured to hold an optical assembly in front of a user's eyes. In some embodiments, the head-mounted display 401 includes a frame 408, which holds an optical assembly, including a right lens 404 and a left lens 406, as shown in FIGS. 4A-4C. The frame 408 may come in various shapes, sizes, and materials (e.g., metal, plastic, composite, or organic material). The left and right lenses 404 and 406 (also referred to herein as "display elements," or simply "displays") may act together or independently to present media (e.g., an image or series of images) to a user. To provide some context, the optical assembly may present a maps application (or some other application) that is visually providing directions to the user of the augmented-reality headset 400. In this example, the user may perceive, through the optical assembly, markings (i.e., the directions) on a surface (e.g., sidewalk) in front of her, and the user may follow the perceived markings to her destination.

In addition, the augmented-reality headsets 400 include one or more transducers 402 coupled to the head-mounted display 401 (e.g., coupled to the frame 408 and/or coupled to the optical assembly). For example, in FIG. 4A, the augmented-reality headset 400 includes a first transducer 402-A coupled to the right lens 404 and a second transducer 402-B coupled to the left lens 406. In another example, in FIG. 4B, the augmented-reality headset 400 includes a plurality of transducers 402-A-402-G coupled to the left lens 406. (While not shown, an equal or different number of transducers 402 may also be coupled to the right lens 404 in FIG. 4B.) In another example, in FIG. 4C, the augmented-reality headset 400 includes a plurality of transducers 402-A-402-F integrated with (e.g., embedded with) the frame 408. In some embodiments, the augmented-reality headset 400 includes some combination of transducers from the example arrangements shown in FIGS. 4A-4C. In addition, the one or more transducers 402 may be coupled to the head-mounted display 401 in a variety of ways, including mechanically fastened, chemically fastened, embedded in a head-mounted display 401, or some combination thereof. As shown in FIGS. 4A-4C, the one or more transducers are not positioned in the user's line of sight (e.g., the transducers 402 coupled to the optical assembly are positioned along an edge of the optical assembly).

The one or more transducers 402 are configured to generate signals that vibrate at least a portion of the optical assembly (e.g., vibrate the right lens 404 and/or the left lens 406). When vibrated by the one or more transducers 402, the optical assembly generates (e.g., transmits or creates) acoustic waves that travel towards the user's ears, and thus the user hears 3D sound. The acoustic waves generated by the optical assembly correspond to the media presented by the head-mounted display 401. That is, the one or more transducers 402 are configured to oscillate/vibrate, and vibration of the one or more transducers 402 causes at least a portion of the optical assembly to also vibrate. As a result, the optical assembly acts as a diaphragm of a speaker. Using the example from above, the optical assembly may present the maps application, which is visually providing directions to the user of the augmented-reality headset 400. Concurrently, the optical assembly may create acoustic waves (i.e., sound) that corresponds to the directions displayed to the user, in response to the one or more transducers 402 vibrating/oscillating. For example, the user may visually perceive, through the optical assembly, a virtual left arrow on the sidewalk in front of her, and concurrently, the user hears "turn left onto Pike Street, and continue straight to your destination, Pike Place Market."

In FIG. 4C, vibration of the frame 408 by the transducers 402-A-402-F causes at least a portion of the optical assembly to vibrate and generate acoustic waves. In some embodiments, the transducers 402 in FIG. 4C are not in contact with any portion of the optical assembly (i.e., vibration of the frame alone causes the optical assembly to vibrate). Alternatively, in some embodiments, the transducers 402 in FIG. 4C directly contact (i.e., abut) an edge (the periphery) of the optical assembly. For example, the transducers 402-A, 402-B, and 402-C may contact the top edge of the left lens 406, and the transducers 402-D, 402-E, and 402-F may contact the top edge of the right lens 404.

In some embodiments, the one or more transducers 402 are coupled to the head-mounted display 401 at different orientations. For example, with reference to FIG. 4B, a first transducer in the transducer array 402-A-402-G may be aligned with the x-axis when coupled to the left lens 406, a second transducer in the transducer array 402-A-402-G may be aligned with the y-axis when coupled to the left lens 406, and so on (e.g., if the augmented-reality headset 400 includes more than two transducers). In some embodiments, multiple transducers are aligned in the same direction.

Additionally, the orientations of the transducers 402 are not limited to the x-axis, y-axis, and z-axis, and many other orientations are possible. By coupling transducers 402 to the same lens at different orientations, directional control of the resulting acoustic waves is improved. That is, the augmented-reality headset 400 can steer (i.e., aim) acoustic waves generated by the optical assembly with greater accuracy and precision by coupling transducers 402 to the same lens at different orientations. Direction of excitation is important because the vibrational force from the transducer to the display element is a 3D vector and the direction of this vector can alter the created sound pressure by the optical element. In some embodiments, the transducers 402 are the same type of transducer.

In some embodiments, instead of or in addition to coupling transducers 402 to the same lens at different orientations, the transducers 402 coupled to the head-mounted display 401 are configured to move (oscillate/vibrate) in different directions. For example, a first transducer 402-A may be a first type of transducer that moves in a first direction (e.g., a piezoelectric configured to expand and contract in a first direction), a second transducer 402-B may be a second type of transducer, different from the first type of transducer, that moves in a second direction (e.g., a piezoelectric configured to expand and contract in a second direction that is perpendicular to the first direction), and so on. Thus, in such embodiments, the coupling (i.e., mounting) of each transducer can be the same, and directional control of the resulting acoustic waves can still be improved.

In some embodiments, as mentioned above, the augmented-reality device 400 includes some transducers 402 coupled to a lens of the head-mounted display 401 and some transducers 402 coupled to the frame 408 of the head-mounted display 401 (e.g., a combination of the embodiments shown in FIGS. 4A and 4C, or a combination of the embodiments shown in FIGS. 4B and 4C). In such embodiments, the transducers 402 coupled to the frame 408 may vibrate the lens in a first direction while the transducers 402 coupled to the lens may vibrate the lens in a second direction different from the first direction (alternatively, the vibration directions may be the same). By vibrating the lens in different directions (e.g., activating at least one transducer coupled to the frame 408 and at least one transducer coupled to the lens), the augmented-reality device 400 can steer (i.e., aim) acoustic waves generated by the optical assembly with greater accuracy and precision.

Unlike conventional designs, the augmented-reality headsets 400 in FIGS. 4A-4C do not include separate speakers positioned within (or covering) the user's ears (which would diminish the user's ability to hear other external sounds). The augmented-reality headsets 400 thus do not hinder or encumber the user's hearing (unless and until sound is generated by the optical assembly). As a result, the augmented-reality headsets 400 can be worn in a social setting, which is not the case with conventional headset designs due to their inclusion of speakers positioned within (or covering) the user's ears. Moreover, as will be discussed in more detail below, the augmented-reality headsets 400 are able to direct (i.e., steer) sound in a particular direction and also limit sound leakage.

The one or more transducers 402 are configured to generate signals within a frequency range, and thus, the signals generated by the one or more transducers 402 vibrate at least a portion of the optical assembly within that frequency range. In some embodiments, each of the one or more transducers 402 is configured to operate in the same frequency range. Alternatively, in some embodiments, at least one transducer of the one or more transducers 402 operates within a different frequency range. For example, with reference to FIG. 4A, the first transducer 402-A may vibrate the right lens 404 at a first frequency within a first range while the second transducer 404-B may vibrate the left lens 406 at a second frequency within a second range (the second frequency may or may not be different from the first frequency). In some embodiments, the frequency of a signal generated by a respective transducer 402 ranges from approximately 20 Hz to approximately 20 kHz (larger or smaller frequency ranges are also possible).

In addition, the signals generated by a respective transducer 402 have an amplitude (e.g., magnitude). The signals generated by the one or more transducers 402 vibrate and displace at least a portion of the optical assembly by a distance, where the displacement distance corresponds to the signal's amplitude. Importantly, a user of the augmented-reality headset 400 (or any other headset discussed herein) does not visually perceive the vibration of the optical assembly. This is because a displacement of the optical assembly, when vibrated by the one or more transducers 402, remains below a threshold displacement, where the threshold displacement corresponds to a minimum amount of movement that can be processed by a human eye (i.e., an amplitude of a signal generated by a respective transducer 402 is constrained according to the threshold displacement). In some embodiments, the amplitude of the signal generated by a respective transducer 402 ranges from approximately 10 nanometers to approximately 10,000 nanometers.

In some embodiments, the augmented-reality headset 400 selects characteristics (e.g., signal (waveform) characteristics, such as phase, gain, direction of vibration, amplitude, and/or frequency) of the generated signals based on a variety of factors. For example, the augmented-reality headset 400 may select values of signal characteristics to account for: (i) the media presented by the head-mounted display 401 (e.g., location of a sound source in artificial reality), (ii) one or more head-related transfer functions (HRTF) computed for a user wearing the augmented-reality headset 400, and (iii) characteristics of the optical assembly (e.g., glass versus synthetic lenses). With respect to item (iii), a mechanical impedance of the optical assembly effects the acoustic waves generated by the optical assembly, and can also influence which type of transducer should be used. Therefore, the mechanical impedance of the optical assembly may be experimentally measured using simultaneous measurements of dynamic force and velocity. Then, the measured mechanical impedance value is used to design (or select) an appropriate transducer for the particular application. Other factors such as the location of a transducer 402 is also considered. For example, if multiple transducers 402 are coupled to a particular lens (e.g., as shown in FIG. 4B), then a relative position of each transducer 402 on the lens may be considered when selecting values of signal characteristics. In some embodiments, the augmented-reality headset 400 performs a calibration process to account for one or more of the factors mentioned above. For example, the augmented-reality headset 400 may calibrate the transducers according to the HRTF computed for the user wearing the augmented-reality headset 400.

In some embodiments, the augmented-reality headset 400 selects (or adjusts) one or more characteristics (e.g., phase, frequency, or amplitude) of the signals so that the acoustic waves generated by the optical assembly converge and constructively interfere at a predetermined location (e.g., a target location). For example, with reference to FIG. 4A, the first transducer 402-A may generate signals having first values (e.g., first values for phase, amplitude, and frequency) and the second transducer 402-B may generate signals having second values (e.g., second values for phase, amplitude, and frequency). The resulting acoustic waves generated by the optical assembly may constructively interfere with each other (at least partially) at a predetermined location. In another example, with reference to FIG. 4B, a first transducer 402-A (or one or more first transducers) on the right lens 404 may generate signals having first values (e.g., first values for phase, amplitude, and frequency), a second transducer 402-B (or one or more second transducers) on the left lens 406 may generate signals having second values (e.g., second values for phase, amplitude, and frequency. The resulting acoustic waves generated by the left lens 406 and the right lens 404 may constructively interfere with each other (at least partially) at a predetermined location.

In some embodiments, the augmented-reality headset 400 selects (or adjusts) one or more characteristics (e.g., phase, frequency, and/or amplitude) of the signals so that acoustic waves generated by the optical assembly converge and destructively interfere at a predetermined location. For example, if a situation calls for sound to be heard primarily by the user's left ear (e.g., a virtual sound source is left of the user), then the augmented-reality headset 400 selects values of signal characteristics so that acoustic waves generated by the optical assembly destructively interfere at the user's right ear. In this way, the volume of sound heard by the user's right ear is diminished, relative to an amount of sound heard by the user's left ear. In addition, destructive interference can also be used to reduce sound leakage to areas surrounding the listener/user. This technique limits the volume of sound generated by the optical assembly that is heard by other people near the listener/user. The augmented-reality headset 400 thus has noise-cancelling capabilities, which is accomplished through destructive interfere of the generated acoustic waves. Various beamforming techniques can be used for combining sound waves destructively and constructively.

In some embodiments, integrated circuits (not shown) of the augmented-reality headset 400, such as a controller circuit and/or waveform (or signal) generator, may control the behavior of the transducers (e.g., the controller 225 in FIG. 2). For example, a controller circuit may select values of signal characteristics (e.g., values for amplitude, frequency, trajectory, direction, and/or phase) used for generating signals that would provide sufficient sound to the user. The controller circuit further selects, at least in some embodiments, different values of characteristics for transducers to effectively steer the acoustic waves generated by the optical assembly in a target direction (e.g., to the user's left ear as opposed to the user's right ear). The controller circuit may also identify one or more transducers 402 that need to be activated in order to generate the desired acoustic waves, and may in turn activate the identified set.

Second Embodiment—Augmented-Reality Headset with Sensor Feedback

FIG. 5 illustrates another embodiment of an example augmented-reality headset 500. The augmented-reality headset 500 is an example of the augmented-reality system 200 and an example of the augmented-reality headset 400. The example artificial-reality headset 500 differs from the augmented-reality headset 400 in that the artificial-reality headset 500 includes a plurality of sensors 502 in addition to the plurality of transducers 402. While some example features are illustrated, various other features have not been illustrated for the sake of brevity and so as not to obscure pertinent aspects of the example implementations disclosed herein (e.g., descriptions of features in common with the augmented-reality headset 400 in FIGS. 4A-4C are not repeated here). In addition, the concepts discussed with the augmented-reality headsets 400, 500 may also be used with the virtual-reality headset 600 discussed with reference to FIG. 6.

The acoustic sensors 502 are examples of the acoustic sensors 220(A)-220(J) in FIG. 2. The acoustic sensors 502 are configured to detect air pressure variations induced by sound waves (i.e., the acoustic sensors 502 detect sound). Each acoustic sensor 502 may be configured to detect sound and convert the detected sound into an electronic format (e.g., an analog or digital format). For example, the acoustic sensors 502 are configured to detect the acoustic waves generated by the optical assembly (e.g., the right lens 404 and left lens 406). As shown in FIG. 5, a first acoustic sensor 502-A is coupled to and positioned towards a first end of the frame 408 and a second acoustic sensor 502-B is coupled to and positioned towards a second end of the frame 408. The first acoustic sensor 502-A is used to monitor sound waves approaching the user's right ear while the second acoustic sensor 502-B is used to monitor sound waves approaching the user's left ear. In some embodiments, the augmented-reality headset 500 includes additional acoustic sensors 502 positioned on the frame 408 (or an external device in communication with the augmented-reality headset 500 includes additional acoustic sensors).

In some embodiments, the sensors 502 are used to determine an optimal location of a respective transducer 402 on the head-mounted display 401. In general, an optimal location for a respective transducer 402 is the location at which the acoustic waves at the ipsi-lateral ear (i.e., ear closest to the respective transducer 402) are maximized while acoustic sound pressure at the contra-lateral ear (i.e., ear furthest from the respective transducer 402) is minimized. In this way, the sensors 502 can be used to reduce leakage and cross-channel contamination between left and right channels (i.e., sound traveling to the left and right ears). In some embodiments, an optimization process is performed during manufacturing of the augmented-reality headset 500 to determine relative positioning of each transducer 402 on the head-mounted display 401.

In some embodiments, the sensors 502 can be used to implement a feedback loop to determine whether the acoustic waves (i.e., sound) generated by the optical assembly match a desired sound for a virtual scene presented by the head-mounted display 401. For example, when one or more transducers 402 generate signals for audio associated with a sound source in a virtual scene (e.g., an avatar speaking to the user), the user hears acoustic waves generated by the optical assembly that result from the one or more transducers 402 vibrating the optical assembly. The sensors 502 also receive the acoustic waves generated by the optical assembly and are configured to generate data associated with the received acoustic waves. In some embodiments, the data generated by the sensors 502 includes acoustic properties of the received acoustic waves. Additionally, the artificial-reality headset 500 can include desired acoustic properties for the audio associated with the sound source (e.g., the desired acoustic properties may be stored in the headset's 500 memory). The artificial-reality headset 500 can therefore compare the acoustic properties of the received acoustic waves with the desired acoustic properties for the audio associated with the sound source. If the acoustic properties of the received acoustic waves matches (within an acceptable tolerance) the desired acoustic properties for the audio, the transducers 402 are deemed to be properly calibrated. However, if the acoustic properties of the received acoustic waves do not match the desired acoustic properties for the audio, the artificial-reality headset 500 may adjust (i.e., tune) one or more of the transducers 402 (and/or may activate different transducers to remedy the situation).

In some embodiments, the feedback loop described above is a calibration process that is used to tune each transducer 402 in the transducer array. The calibration process may be used to periodically check operation of the augmented-reality headset's 500 audio playback (i.e., check whether the transducers 402 are tuned properly). In addition, the calibration process may be required when a new user is wearing the augmented-reality headset 500 (e.g., to account for the user's unique HRTF).

In some embodiments, acoustic fingerprinting techniques are used when comparing the acoustic properties of the received acoustic waves with the desired acoustic properties for the audio. In such embodiments, the artificial-reality headset 500 stores template acoustic fingerprints in its memory. In some embodiments, the acoustic properties include one or more of pitch, duration, loudness, timbre, sonic texture, and spatial location. In some embodiments, the sensors provide the data to a controller controlling the one or more transducers 402 (e.g., the controller tunes the transducers 402).

In some embodiments, the sensors 502 can also be used to implement a feedback loop to reduce (or eliminate) leakage and cross-channel contamination between left and right channels. For example, a sound source in a virtual scene may be positioned to the left of the user. The user would expect sound originating from the virtual sound source to be heard mostly by his or her left ear. Accordingly, when one or more transducers 402 generate signals, the user hears acoustic waves generated by the optical assembly that result from the one or more transducers 402 vibrating. Thereafter, the first sensor 502-A and the second sensor 502-B receive the acoustic waves generated by the optical assembly. The first sensor 502-A and the second sensor 502-B are configured to generate data associated with the received acoustic waves and provide that data to a controller controlling the one or more transducers 402. If the data indicates that the first sensor 502-A (at the right ear) is receiving too much sound (e.g., a sound pressure threshold is reached), operation of the one or more transducers 402 may be adjusted (tuned) (and/or may activate different transducers to remedy the situation). For example, the artificial-reality headset 500 (or a component thereof, such as a characteristics selection module) may adjust one or more signal characteristics to remedy the situation (e.g., adjust values of phase, amplitude, and/or frequency).

Third Embodiment—Virtual-Reality Headset

Figure 6:
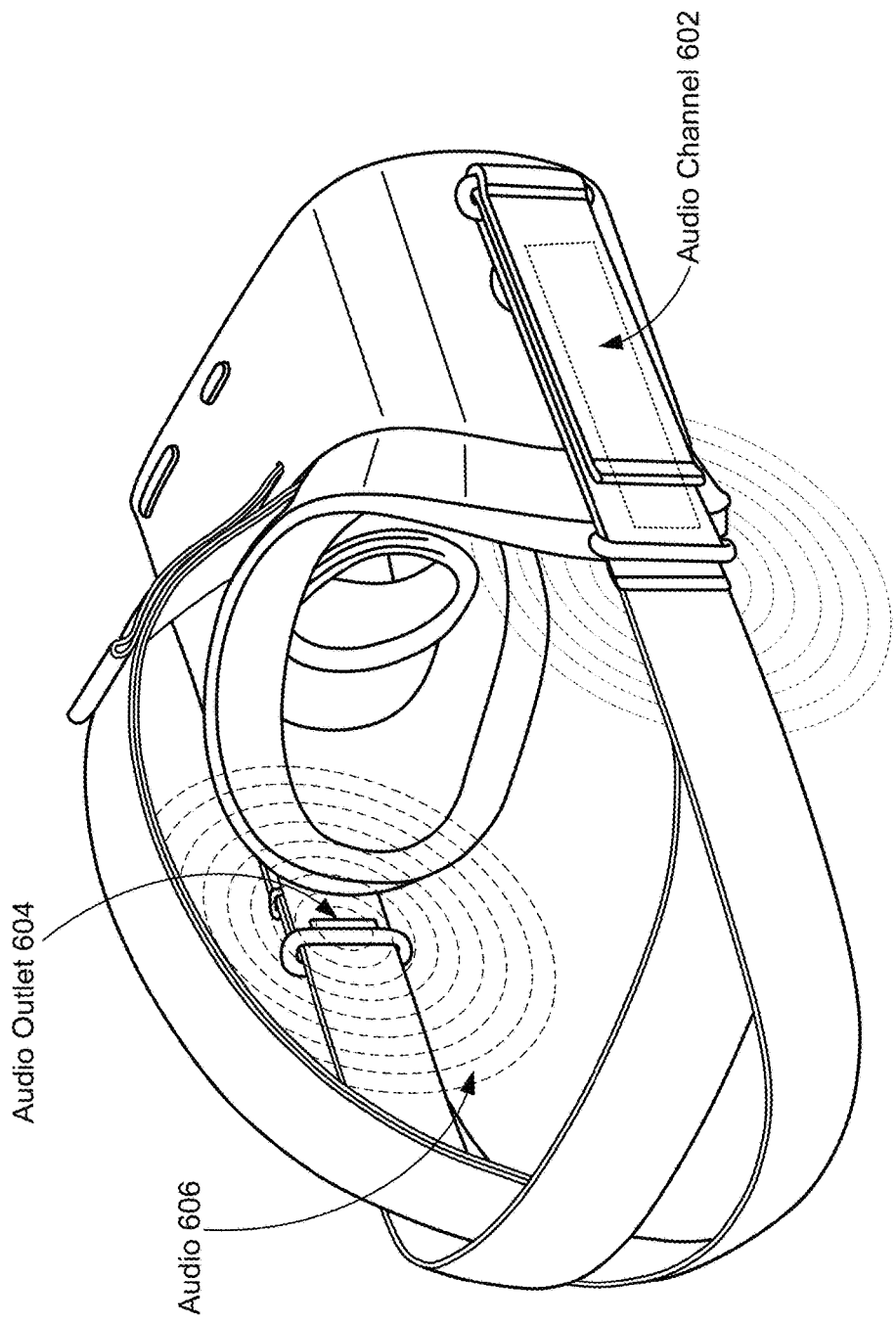
FIG. 6 illustrates an embodiment of a virtual-reality headset with a plurality of transducers in accordance with some embodiments.

FIG. 6 illustrates an embodiment of a virtual-reality (or mixed-reality) headset 600. The virtual-reality headset 600 is an example of the virtual-reality system 300. The virtual-reality headset 600 may include the same (or similar) components to the artificial-reality headsets 400 and 500 discussed above. For example, the virtual-reality headset 600 may include a plurality of transducers 402 for creating audio playback. In addition, in some embodiments, the virtual-reality headset 600 includes a plurality of sensors 502 to implement the feedback loops discussed above with reference to FIG. 5. The virtual-reality headset 600 also includes one or more electronic elements, including one or more electronic displays. For the sake of brevity, duplicate description of the transducers 402 and sensors 502 is not repeated here.

Like the augmented-reality headsets 400 and 500 discussed above, the virtual-reality headset 600 includes one or more transducers 402 coupled to the one or more electronic displays. However, unlike the augmented-reality headsets, the virtual-reality headset 600 mostly or completely covers a user's field of view. Thus, the one or more transducers 402 may be positioned in various places on the one or more electronic displays, including in the user's line of sight. The one or more transducers 402 can be placed at any location around the display, as well as behind the display in order to create the best audio output.

In some embodiments, the virtual-reality headset 600 includes audio channels (e.g., audio channel 602) integrated with strap portions of the virtual-reality headset 600. Each audio channel includes a first opening adjacent to one of the electronic displays, and a second opening (e.g., audio outlet 604) designed to be positioned adjacent to one of the user's ears (e.g., when the user is wearing the virtual-reality headset 600). Accordingly, when a respective transducer 402 generates signals that cause a respective electronic display to vibrate and generate acoustic waves, the generated acoustic waves (e.g., audio 606) enter one (or both) of the audio channels via the first opening, and exit the audio channel by the second opening (e.g., audio outlet 604). In this way, audio (i.e., sound) generated by the electronic displays is fed into the user's ear via the audio channel(s), and thus, a more efficient sound delivery system is created.

Acoustic Domain and Sound Pressure Level Graphics

Figure 7A:
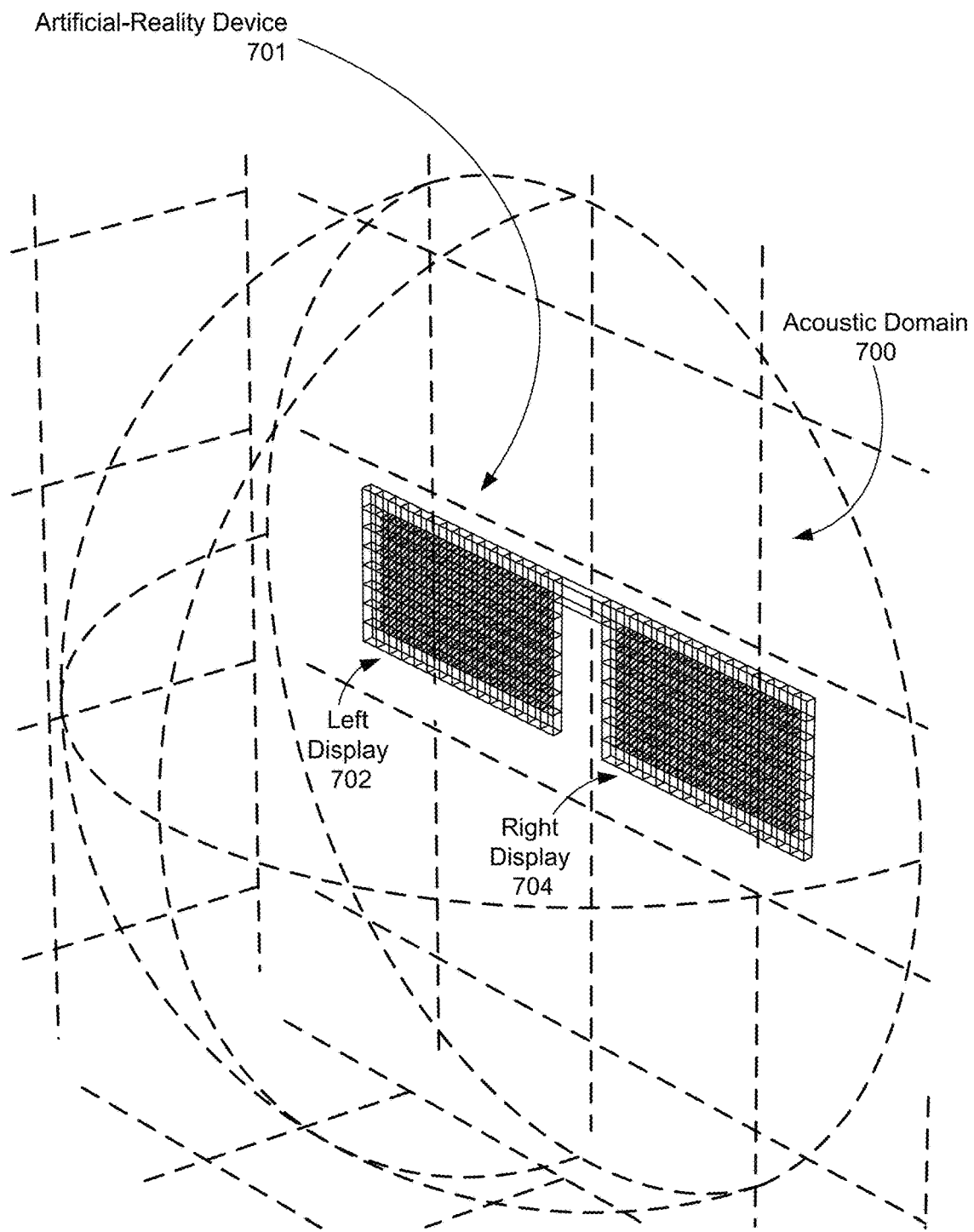
FIGS. 7A and 7B illustrate an acoustic domain of an example artificial-reality device in accordance with some embodiments.
Figure 7B:
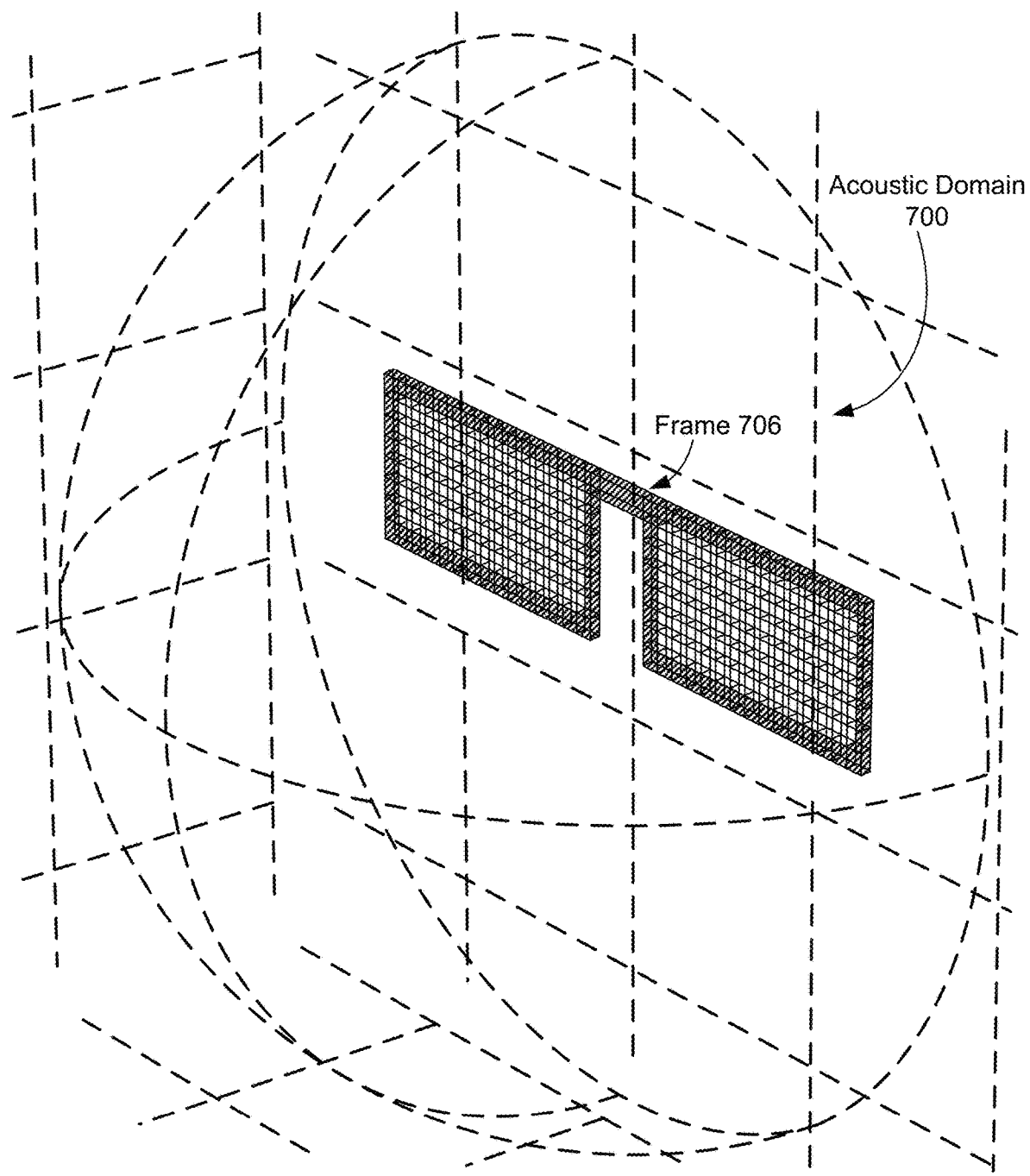

FIGS. 7A and 7B illustrate an acoustic domain 700 of an example artificial-reality device 701, which may be any one of the augmented-reality device 400, the augment-reality device 500, or the virtual-reality device 600. FIGS. 7A and 7B provide context for the description of FIGS. 8A through 12D. As shown, the example artificial-reality device 701 has a corresponding acoustic domain 700, and the artificial-reality device 701 includes a left display 702 and a right display 704 (the cross-hatch patterns shown in FIG. 7A), along with a frame 706 (the cross-hatch pattern shown in FIG. 7B) that holds the left and right displays. For the discussion below, the left and right displays are modeled with glass components with a thickness of approximately 2 mm, and the frame 706 is modeled with steel material properties (although, the frame may be made from various other materials). While not shown in FIGS. 7A and 7B, the left display 702 and/or the right display 704 includes one or more transducers 402 coupled thereto. For the discussion below, the transducers are rigidly coupled to the left and right displays. In some embodiments, mounting of transducers to the left and right displays can be optimized to improve the generated sound and audio. In one example, instead of rigidly mounting the transducers the left and right displays, the transducers may be coupled using compliant attachments, such as silicone. Compliant attachments are used to improve the energy transfer from the transducer to the lens or the optical element, mainly by reducing a mechanical impedance mismatch between the transducer and the optical lens or display.

Figure 8A:
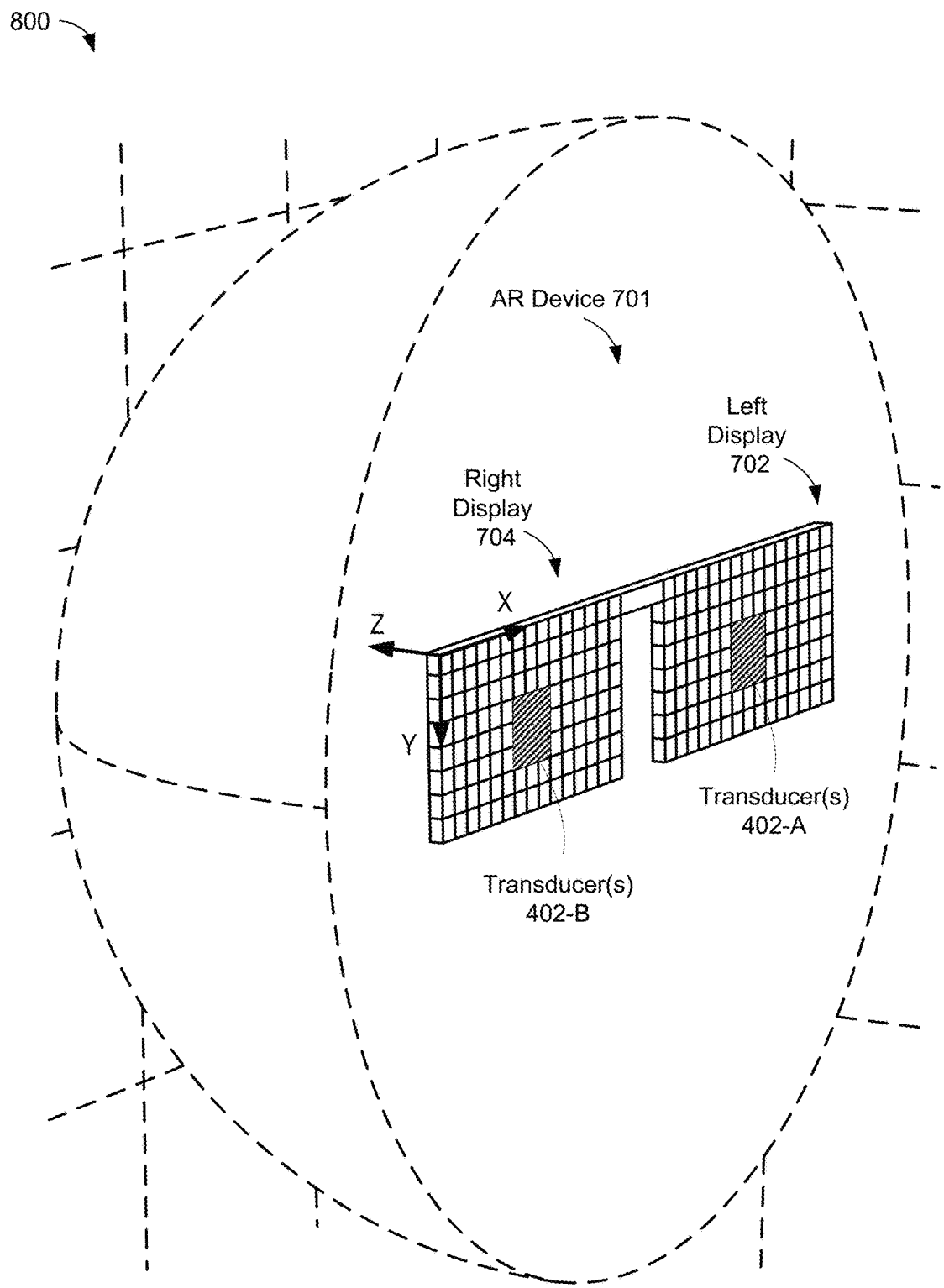
FIGS. 8A-8C illustrate an example arrangement of transducers on left and right displays of a headset, along with resulting sound pressure levels at the user's left and right ears, in accordance with some embodiments.
Figure 8B:
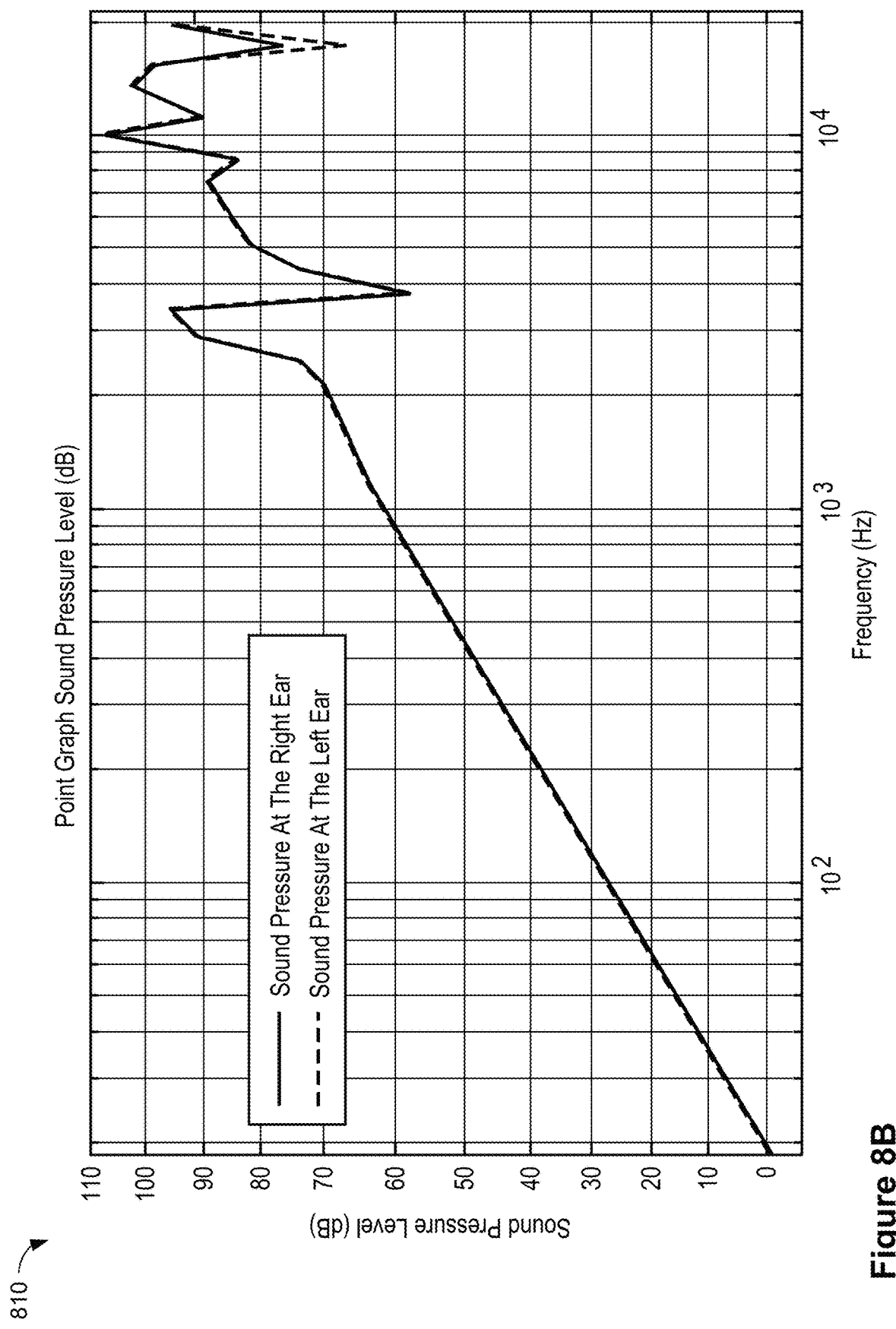
Figure 8C:
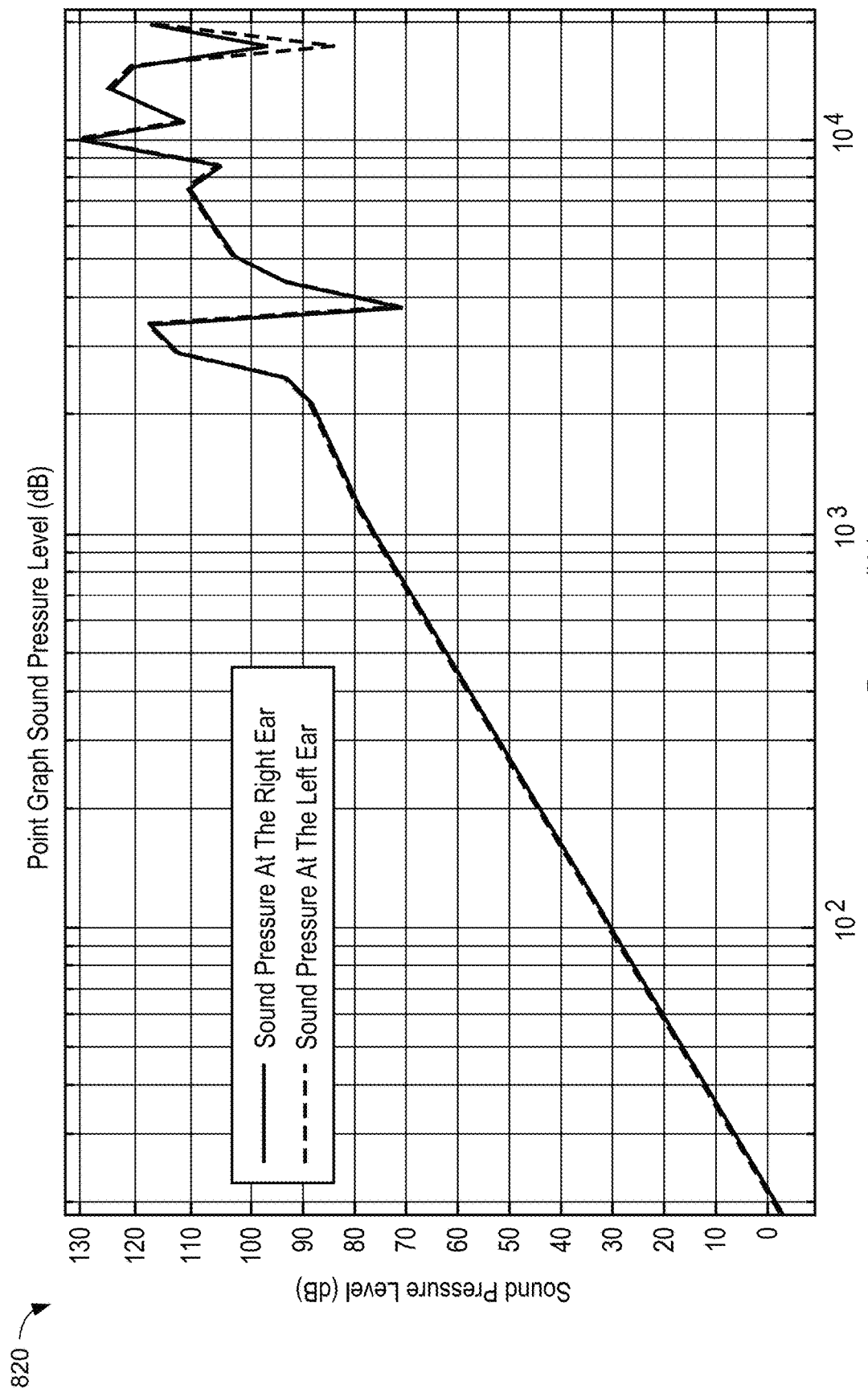

FIGS. 8A-8C illustrate an example arrangement 800 of transducers on the left and right displays, along with resulting sound pressure levels at the user's left and right ears, in accordance with some embodiments. As shown in FIG. 8A, the artificial-reality device 701 includes (i) one or more transducers 402-A positioned in a central region of the left display 702, and (ii) one or more other transducers 402-B positioned in a central region of the right display 704. In some embodiments, the size of the one or more transducers 402-A and 402-B is approximately 12×12 mm (in other embodiments, the size of the transducers is larger or smaller than 12×12 mm). When activated, the transducers 402 shown in FIG. 8A are configured to vibrate/oscillate along the z-axis.

FIGS. 8B and 8C are graphics 810 and 820 that illustrate resulting sound pressure levels at the user's left and right ears from the transducer arrangement 800 shown in FIG. 8A. Specifically, in FIG. 8B, the transducers 402 shown in FIG. 8A vibrate/oscillate with an amplitude of 100 nm, along the z-axis. As shown in the graphic 810, the sound pressure at the right ear (solid line) substantially mirrors the sound pressure at the left ear (dashed line). In FIG. 8C, the transducers 402 shown in FIG. 8A vibrate/oscillate at an amplitude of 1000 nm, along the z-axis. As shown in the graphic 820, the sound pressure at the right ear (solid line) substantially mirrors the sound pressure at the left ear (dashed line).

Figure 9A:
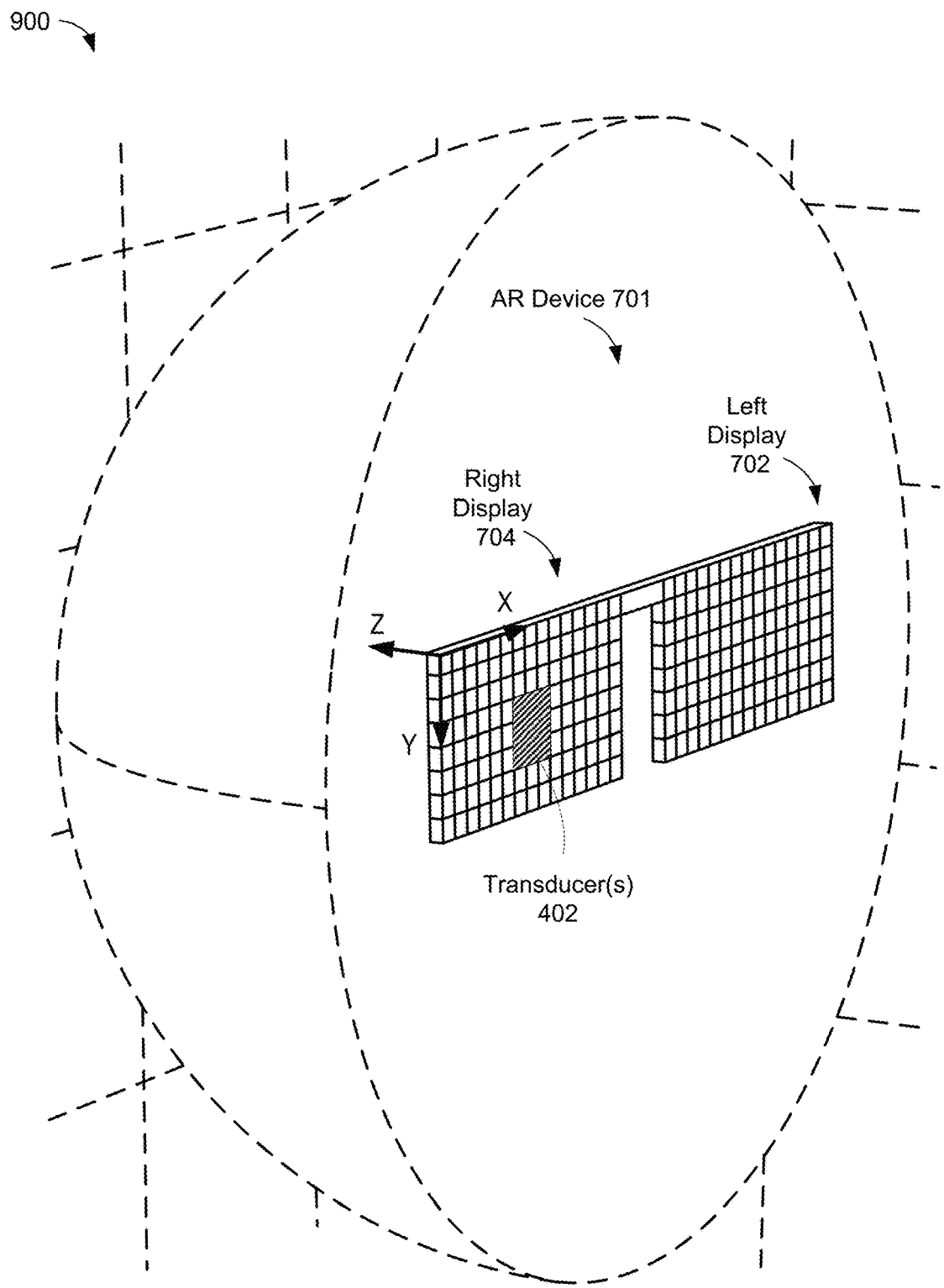
FIGS. 9A-9B illustrate an example arrangement of transducers on a right display of a headset, along with resulting sound pressure levels at the user's left and right ears, in accordance with some embodiments.
Figure 9B:
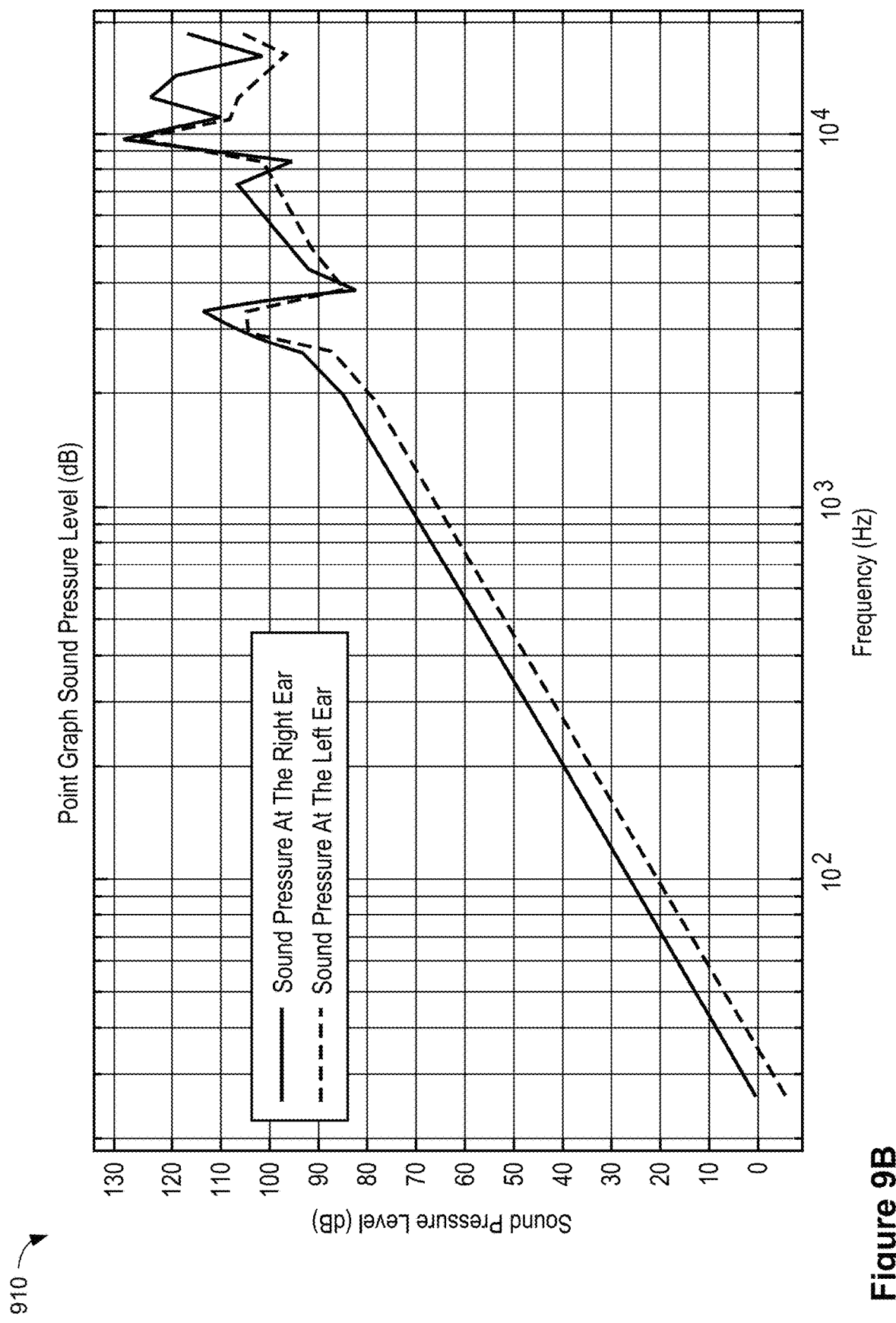

FIGS. 9A-9B illustrate an example arrangement 900 of transducers on the right display 704, along with resulting sound pressure levels at the user's left and right ears, in accordance with some embodiments. As shown in FIG. 9A, the artificial-reality device 701 includes one or more transducers 402 positioned in a central region of the right display 704. When activated, the transducers 402 shown in FIG. 9A are configured to vibrate/oscillate at an amplitude of 100 nm, along the z-axis. The arrangement 900 of transducers in FIG. 9A may be the same as the arrangement 800 of transducers in FIG. 8A, and the difference between FIGS. 8A and 9A is that only the transducers on the right display 704 are activated in FIG. 9A. The left display 702 either has no transducers or the transducers are not activated in this example.

FIG. 9B is a graphic 910 that illustrates resulting sound pressure levels at the user's left and right ears from the transducer arrangement 900 shown in FIG. 9A. As shown in the graphic 910, the sound pressure at the right ear (solid line) differs from the sound pressure at the left ear (dashed line). For example, the sound pressure at the right ear tends to be greater than the sound pressure at the left ear. This result can be attributed to the right display 704 creating sound waves and the left display 702 not creating sound waves.

Figure 10A:
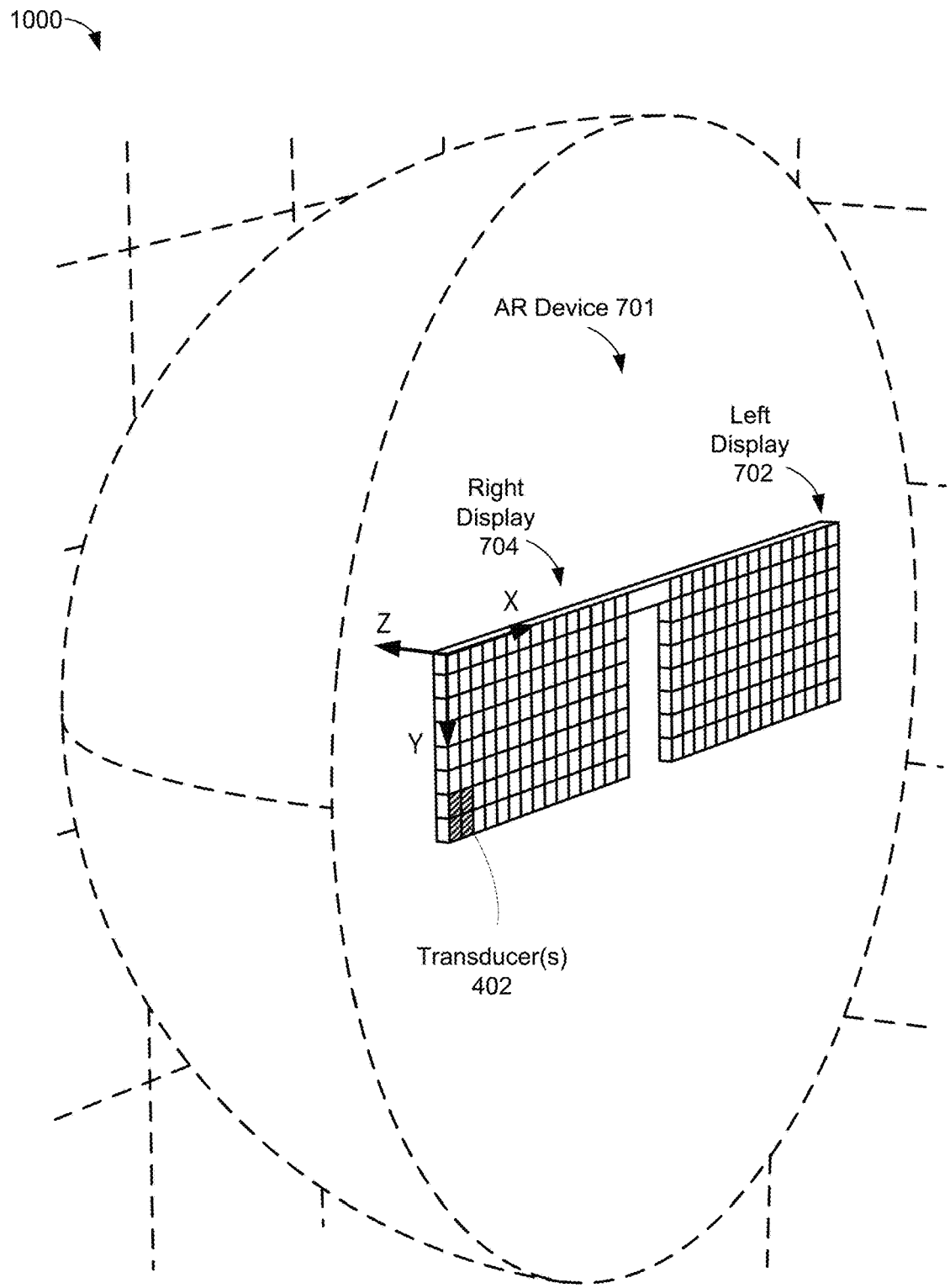
FIGS. 10A-10B illustrate an example arrangement of transducers on a right display of a headset, along with resulting sound pressure levels at the user's left and right ears, in accordance with some embodiments.
Figure 10B:
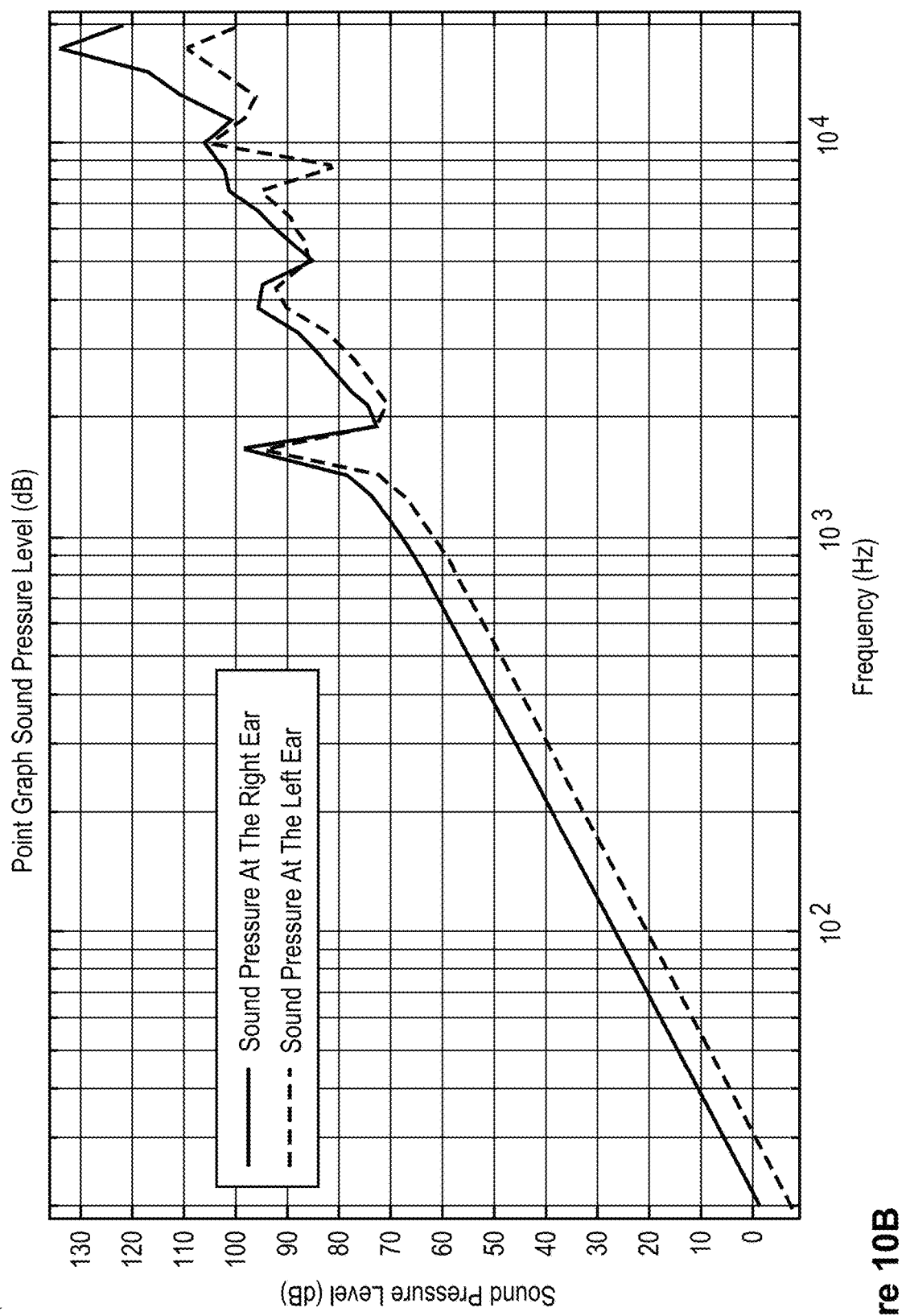

FIGS. 10A-10B illustrate an example arrangement 1000 of transducers on the right display 704, along with resulting sound pressure levels at the user's left and right ears, in accordance with some embodiments. As shown in FIG. 10A, the artificial-reality device 701 includes one or more transducers 402 positioned in a corner region of the right display 704. The transducers 402 shown in FIG. 10A are configured to vibrate/oscillate at a magnitude of 1000 nm, along the z-axis. The arrangement 1000 of transducers in FIG. 10A may be the same as the arrangements of transducers in FIGS. 8A and/or 9A, with the difference between FIGS. 8A, 9A, and 10A being that only specific transducers on the right display 704 are activated in FIG. 10A. For example, the left display 702 and the right display 704 may have a transducer arrangement similar to the transducer arrangement shown in FIG. 4B, and the artificial-reality device 701 may be selectively activating a subset of transducers based on the circumstances (e.g., a virtual sound source may be positioned to the right of the user, and therefore, the user would expect sound originating from the virtual sound source to be heard mostly by his or her right ear).

FIG. 10B is a graphic 1010 that illustrates resulting sound pressure levels at the user's left and right ears from the transducer arrangement shown in FIG. 10A. As shown in the graphic 1010, the sound pressure at the right ear (solid line) differs from the sound pressure at the left ear (dashed line). For example, the sound pressure at the right ear tends to be greater than the sound pressure at the left ear. This result can be attributed to the right display 704 creating sound waves and the left display 702 not creating sound waves.

Figure 11A:
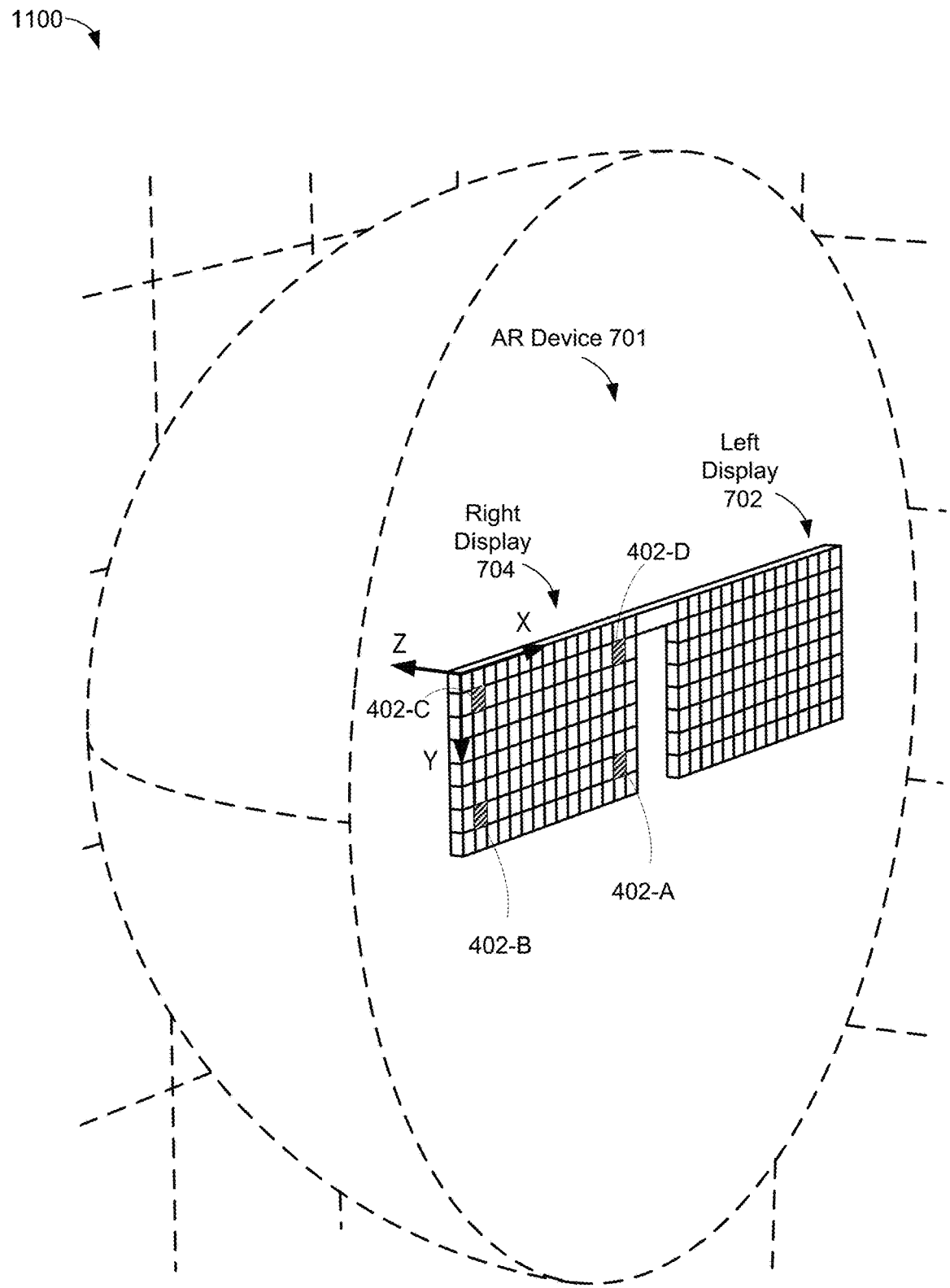
FIGS. 11A-11C illustrate an example arrangement of transducers, along with resulting sound pressure levels at the user's left and right ears, in accordance with some embodiments.
Figure 11B:
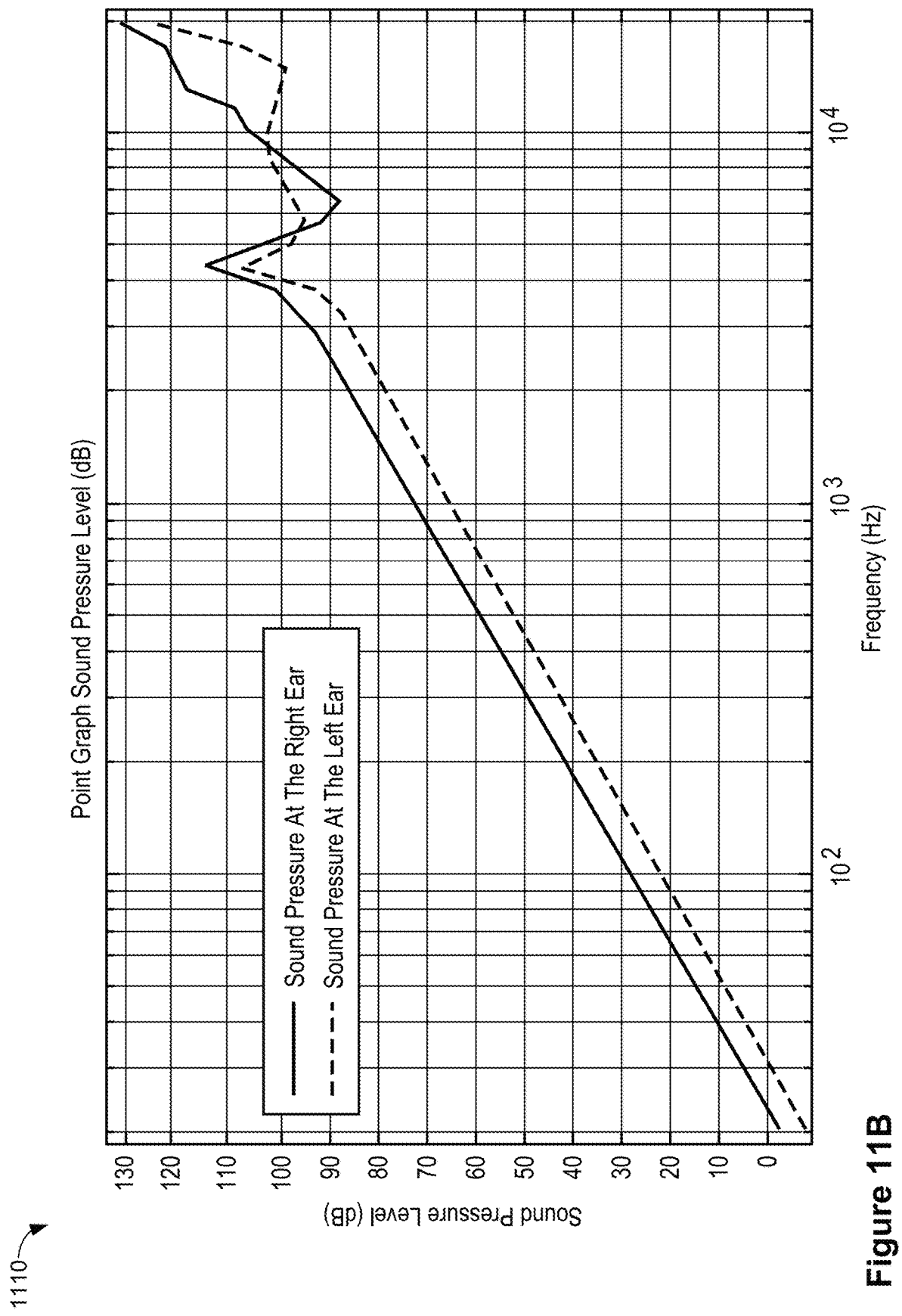
Figure 11C:
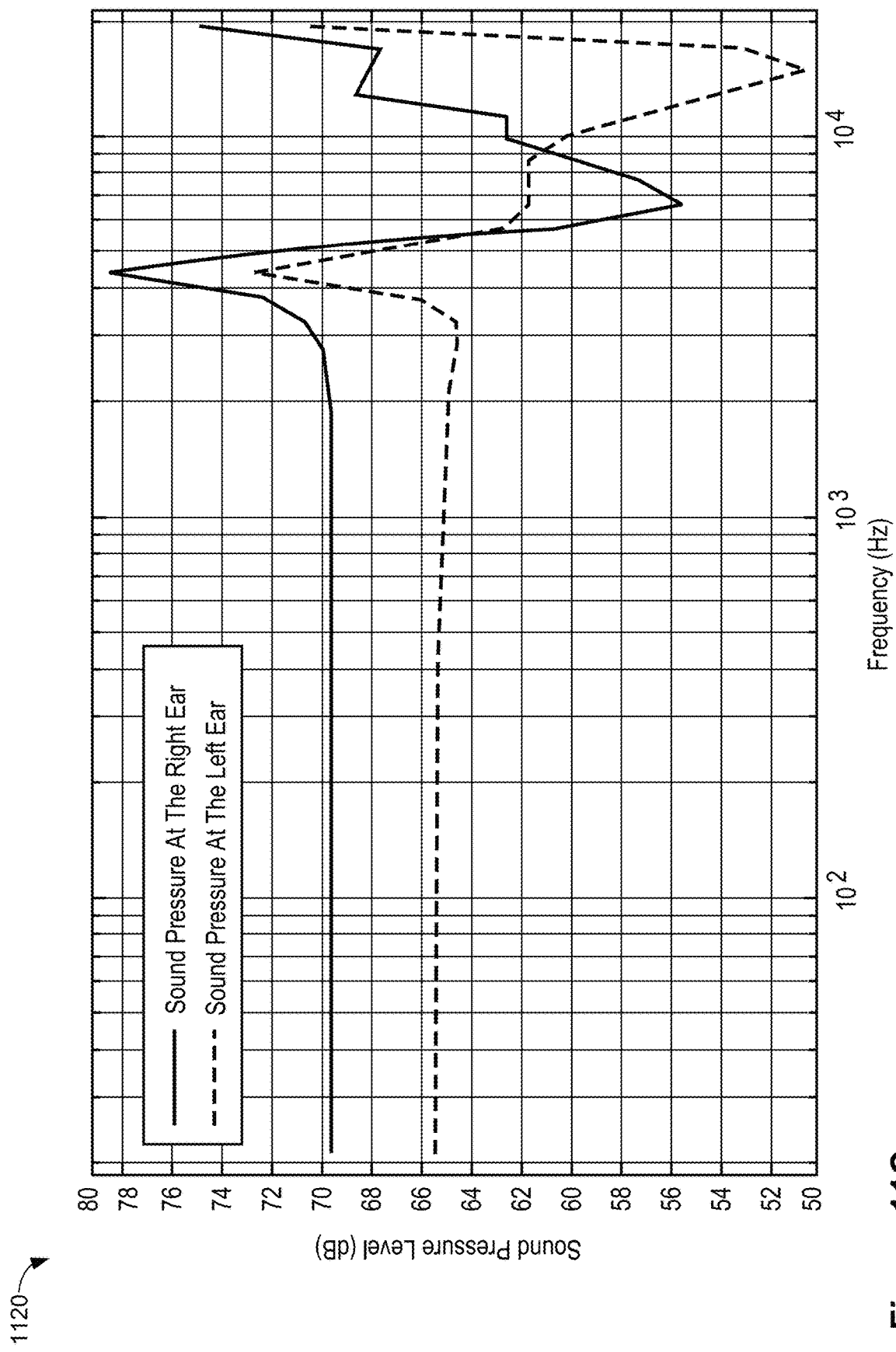

FIGS. 11A-11C illustrate an example arrangement 1100 of transducers, along with resulting sound pressure levels at the user's left and right ears, in accordance with some embodiments. As shown in FIG. 11A, the artificial-reality device 701 includes multiple transducers 402-A-402-D positioned near each corner of the right display 704. The transducers 402 shown in FIG. 11A are each 4×4 mm, and each is configured to vibrate/oscillate at an amplitude of 1000 nm, along the z-axis. FIG. 11B is a graphic 1110 that illustrates resulting sound pressure levels at the user's left and right ears from the transducer arrangement 1100 shown in FIG. 11A. As shown in the graphic 1110, the sound pressure at the right ear (solid line) differs from the sound pressure at the left ear (dashed line). For example, the sound pressure at the right ear tends to be greater than the sound pressure at the left ear. This result can be attributed to the right display 704 creating sound waves while the left display 702 is not creating sound waves.

Each graphic discussed above involves constant magnitude of vibration from the transducers 402 to the display element (e.g., constant magnitude of 1000 nm displacement, peak-to-peak). FIG. 11C is a graphic 1120 that illustrates sound pressure levels at the user's left and right ears when the magnitude of vibration is not constant. Instead, an acceleration is applied from the transducers 402 to the display element. In this example, the vibration acceleration is approximately 20 m/s$^2$ along the z-axis (zero to peak), which is equal to 1000 nm displacement at 1000 Hz.

Figure 12B:
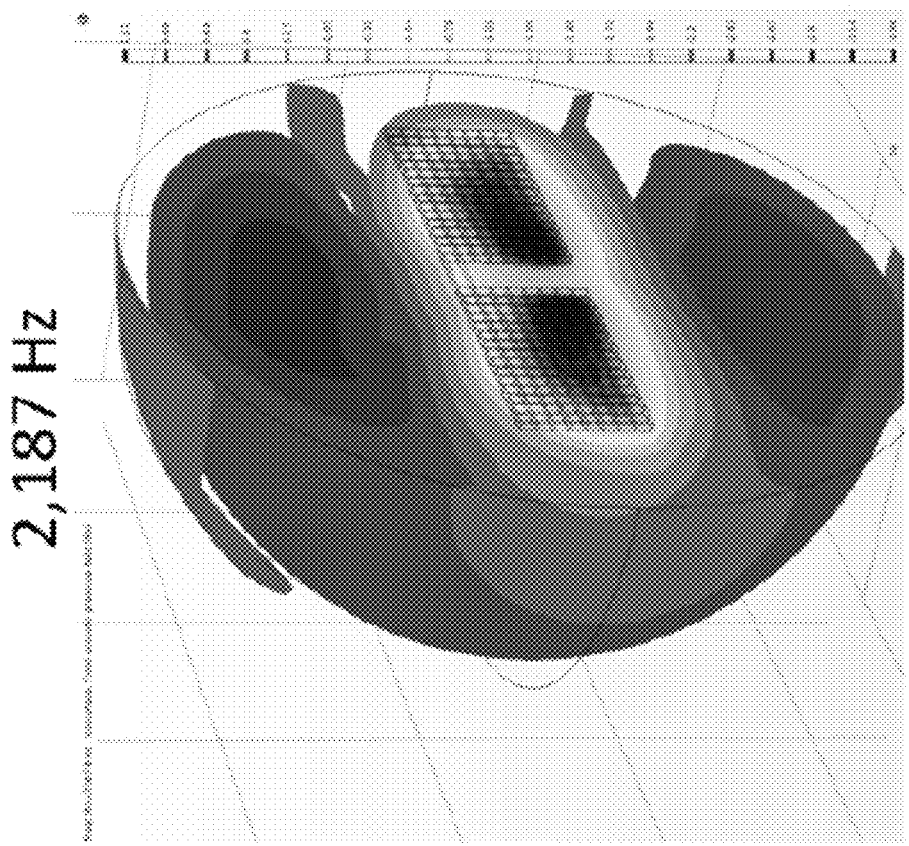
FIGS. 12A-12D are models that illustrate acoustic pressure fields around a user's head created using different frequencies.
Figure 12A:
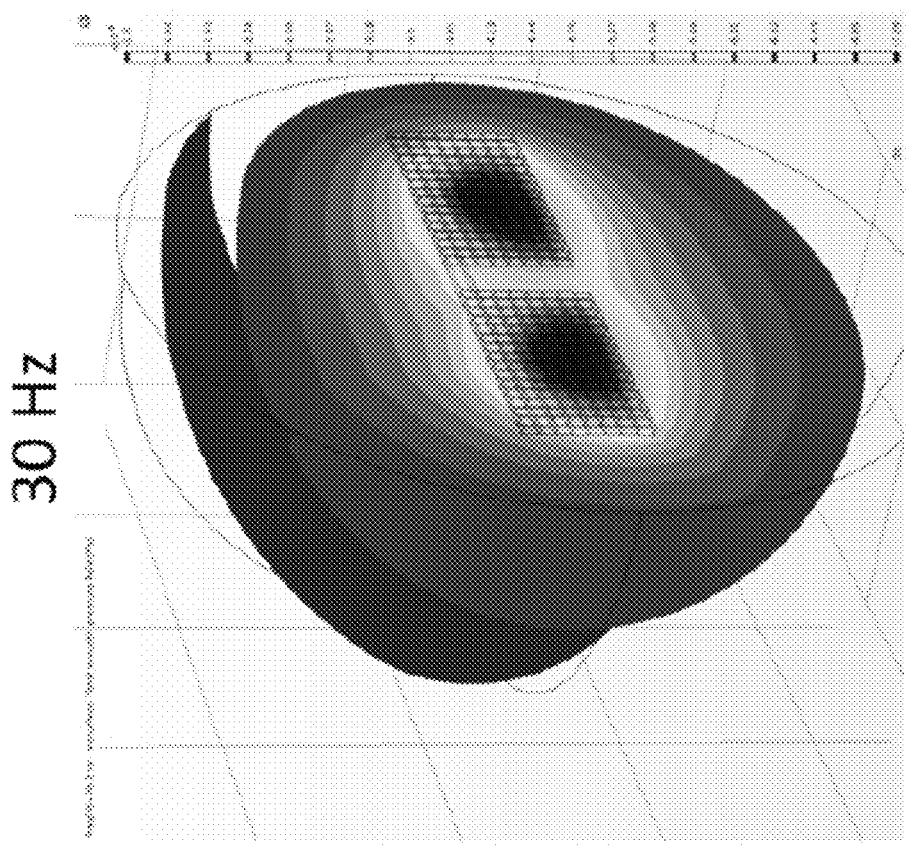
Figure 12D:
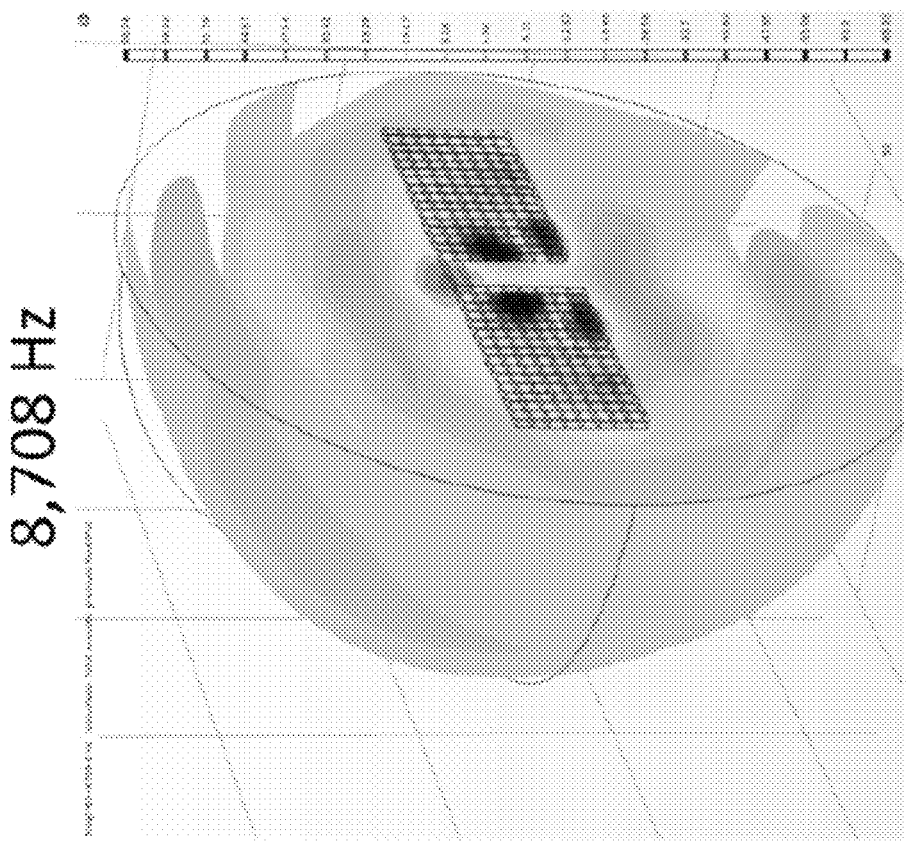
Figure 12C:
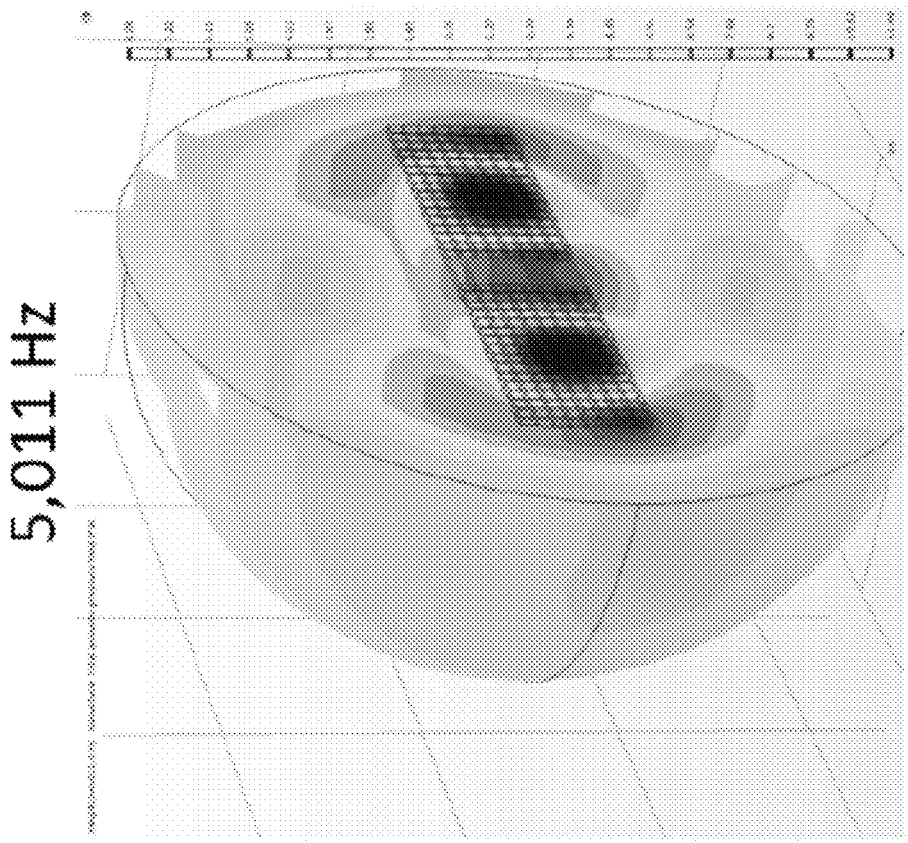
Figure 13:
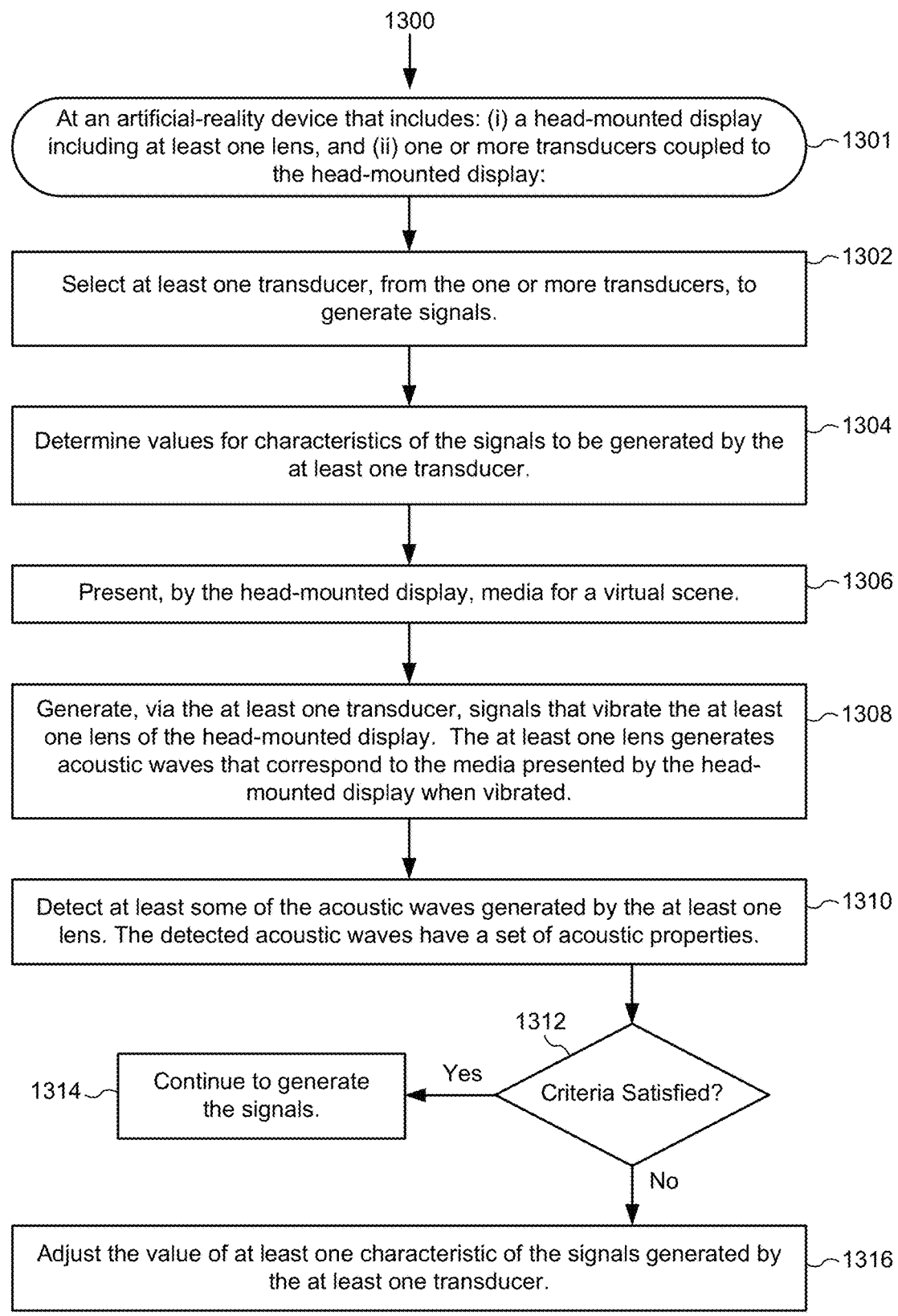
FIG. 13 is a flow diagram showing a method of generating audio for an artificial-reality device in accordance with some embodiments.

FIGS. 12A-12D are models that illustrate a total acoustic pressure field (in Pascals) around a user's head created using different frequencies. The acoustic pressure field is created from two 12×12 mm transducers located in the center of the right display and the left display (e.g., the transducer arrangement 800 in FIG. 8A). In FIG. 12A, the transducers are operating at 30 Hz (e.g., signals generated by the transducers have a frequency of 30 Hz). In FIG. 12B, the transducers are operating at 2,187 Hz. In FIG. 12C, the transducers are operating at 5,011 Hz and in FIG. 12D the transducers are operating at 8,708 Hz.

Method of Operation

FIG. 13 is a flow diagram showing a method of audio playback in accordance with some embodiments. Operations (e.g., steps) of the method 1300 may be performed by any of the artificial-realty device's described herein (or any combination thereof). At least some of the operations shown in FIG. 13 correspond to instructions stored in a computer memory or computer-readable storage medium (e.g., memory discussed above with references to FIGS. 1-3). For example, the operations of the method 1300 may be performed, at least in part, by an artificial-reality generation module, an audio output module, a signal generating module, a characteristics selection module, and a display module.

As one example, the method 1300 may be performed (1301) at an artificial-reality device that includes: (i) a head-mounted display including at least one lens, and (ii) one or more transducers coupled to the head-mounted display. The artificial-reality device may be the augmented-reality headset 400 in any of FIGS. 4A-4C, each of which includes a head-mounted display 401 with a right lens 404 and a left lens 406 (and a frame 408), along with one or more transducers 402 coupled to each lens (and/or the frame 408). The method 1300 is not limited to an augmented-reality headset 400, and any other device/system discussed herein can also be used (e.g., the method 1300 could also be performed at any of the devices discussed in FIGS. 1, 2, 3, 5, and 6, or combinations thereof).

In some embodiments, the method 1300 includes, based at least in part on media (e.g., images and/or audio) to be presented by the head-mounted display, selecting (1302) at least one transducer, from the one or more transducers, to generate signals. For example, with reference to FIG. 4A, the first transducer 402-A is selected while the transducer 402-B is not selected (or vice versa, or both are selected). In another example, with reference to FIG. 4B, one or more first transducers on the left lens 406 are selected while one or more transducers (or no transducers) on the rights lens 404 are selected. In some embodiments, selecting the at least one transducer is more specifically based on the audio data of the media, where the audio data is associated with a sound source in a virtual scene of the media. For example, the sound source in the virtual scene may be located to the left of (or in front of, to the right of, behind) the user (or the user's avatar), and the sound source may generate some audio data (e.g., an opponent's avatar in a video game may located to the left of the user). In such instances, the at least one transducer (or multiple transducers) may be selected because it is (they are) the transducer (transducers) most suitable to process the audio data.

In some embodiments, the selecting (1302) of the at least one transducer involves performing a direction of arrival ("DOA") analysis to determine a location of the sound source in the virtual scene, and the selecting is performed based on a result of the DOA analysis. Moreover, in some embodiments, selecting the at least one transducer is also based on a head-related transfer function (HRTF) associated with a user wearing the head-mounted display. It is noted that in order to auralize sound for a given source direction, one or more HRTF filters are computed for that direction, then convolved with dry input audio to generate binaural audio. DOA analysis and HRTFs are discussed in further detail above with reference to FIGS. 1-3.

In some embodiments, the method 1300 includes determining (1304) characteristics of the signals to be generated by the at least one transducer based, at least in part, on the media to be displayed by the head-mounted display. The characteristics of the signals may include but are not limited to (i) frequency, (ii) amplitude, and (iii) phase. Thus, the determining (1304) can involve determining values for frequency, amplitude, and/or phase based, at least in part, on the media to be displayed by the head-mounted display (e.g., based on a location of the sound source or sources, and/or based on an intensity of the sound). The characteristics of the signals can also be based on additional factors, including the HRTF(s) computed for the user wearing the head-mounted display and characteristics of the at least one lens. To illustrate, when an opponent's avatar is located to the left of the user, the user would expect sound originating from the opponent's avatar (i.e., the sound source) to be heard mostly by his or her left ear. As such, the artificial-reality device may select values of characteristics for the signals to be generated by the at least one transducer so that the resulting acoustic waves are mostly heard by the user's left ear. Each signal to be generated by the at least one transducer may be altered according to a user's HRTF and according to measurements of the user's location and the location of the sound source so that sound generated by the at least one lens (discussed below) sounds as if it is coming from the determined location of the sound source. Re-rendering sound signals (e.g., audio data) is discussed in further detail above with reference to FIGS. 1-3.

In some embodiments, the method 1300 includes presenting (1306), by the head-mounted display, the media for the virtual scene. For example, a virtual scene may be displayed on (or perceived through) the display(s) of the head-mounted display, using augmented reality, virtual reality, mixed reality, or some combination thereof. In addition, within the presented virtual scene, the user may or may not see a sound source. For example, the virtual scene may include the avatar of the user's opponent (as discussed above). As a result, the user can see his or her opponent. In another example, the sound source may be invisible (e.g., the wind) or some sound that is currently not part of the virtual scene.

In some embodiments, the method 1300 includes, concurrently with presenting the media, generating (1308), via the at least one transducer of the one or more transducers, signals (e.g., having the determined values from step 1304) that vibrate the at least one lens of the head-mounted display. The at least one lens generates acoustic waves that correspond to the media presented by the head-mounted display when vibrated by the at least one transducer. For example, if the media presented by the head-mounted display includes a virtual scene with a sound source generating audio, the acoustic waves generated by the at least one lens playback the audio generated by the sound source (e.g., the user can hear his opponent's avatar speaking). Accordingly, the head-mounted display not only visually displays media, but also concurrently generates audio for the displayed media.

In some embodiments, the method 1300 includes detecting (1310), via one or more acoustic sensors (e.g., the sensors 502-A and 502-B in FIG. 5) of the artificial-reality device, at least some of the acoustic waves generated by the at least one lens, where the detected acoustic waves have a set of acoustic properties. The set of acoustic properties may include but is not limited to: pitch, duration, loudness, phase, timbre, sonic texture, and spatial location (and/or any other acoustic characteristic used in acoustic recognition or acoustic fingerprinting). In some embodiments, each of the acoustic properties has a known relationship with characteristics of signals generated by transducers of the artificial-reality device. In addition, a transducer's location on the head-mounted display can also be associated with one or more acoustic properties in the set of acoustic properties.

In some embodiments, the method 1300 also includes determining (1312) whether the set of acoustic properties satisfies criteria associated with the audio data. In some embodiments, the criteria associated with the audio data is a set of desired acoustic properties. In other words, for the generated acoustic waves, there are desired values for one or more of pitch, duration, loudness, timbre, sonic texture, and/or spatial location (and any other properties or characteristics used in acoustic recognition and acoustic fingerprinting). Thus, determining whether the set of acoustic properties satisfies the criteria may include comparing the set of acoustic properties for the detected acoustic waves with a set of desired acoustic properties for the detected acoustic waves. In some embodiments, the set of acoustic properties satisfies the criteria when the set of acoustic properties substantially match the set of desired acoustic properties (e.g., each desired acoustic property has a desired value and an associated acceptable tolerance, such as plus or minus X-number of dB for loudness, plus or minus Y-number of Hz for pitch). In some embodiments, acoustic fingerprinting is used to determine whether the set of acoustic properties satisfies criteria associated with the audio data. For example, the artificial-reality device may store acoustic fingerprints associated with various audio data, and the set of acoustic properties (which itself could be in the form of an acoustic fingerprint) may be evaluated against the stored acoustic fingerprints.

In some embodiments, in accordance with a determination that the set of acoustic properties satisfies the criteria (1312—Yes), the method 1300 includes continuing (1314), by the at least one transducer, to generated the signals (i.e., the at least one transducer does not require tuning or adjustment). Alternatively, in accordance with a determination that the set of acoustic properties does not satisfy the criteria (1312—No), the method 1300 includes adjusting (e.g., tuning) (1316) the at least one transducer. For example, one or more values for phase, amplitude, and/or frequency for the signals may be modified according to a difference between the set of acoustic properties and the criteria. Doing so causes the at least one lens to generate updated acoustic waves that have an updated set of acoustic properties, which may satisfy the criteria. Steps 1310, 1312, and 1316 may be repeated until the set of acoustic properties for the generated acoustic waves satisfy the criteria. In some embodiments, steps 1310, 1312, and 1316 are performed during a calibration process of the artificial-reality device (e.g., steps 1310, 1312, and 1316 may be performed before steps 1301, 1302, 1304, 1306, 1308) or all of the steps of the method 1300 comprise a calibration process. Feedback loops and calibration are discussed in further detail above with reference to FIGS. 1-3 and FIG. 5.

In some embodiments, in accordance with a determination that the set of acoustic properties do not satisfy the criteria (1312-No), the method 1300 includes activating one or more other transducers (and in some instances, deactivating the at least one transducer). This operation may be performed separately from or concurrently with step 1316. To illustrate, with reference to FIG. 4B, the process may initially involve a first transducer 402-A generating signals. However, based on the sensor feedback, the augmented-reality device 400 may activate one or more of the transducers 402-B-402-G, depending on the circumstance. Additionally, the augmented-reality device 400 may deactivate the first transducer 402-A if the set of acoustic properties for the generated acoustic waves diverges significantly from the criteria.

In some embodiments, the at least one lens is a first lens and the at least one transducer is a first transducer, and the method 1300 further includes generating other signals, via a second transducer of the one or more transducers, that vibrate a second lens of the head-mounted display, where the second lens generates additional acoustic waves that correspond to the media presented by the head-mounted display when vibrated by the second transducer. In some embodiments, the acoustic waves generated by the first lens are primarily heard by a first ear of the user and the additional acoustic waves generated by the second lens are primarily heard by a second ear of the user. In some embodiments, the additional acoustic waves generated by the second lens have different acoustic properties relative to the acoustic properties of the acoustic waves generated by the first lens.

In some embodiments, the method 1300 includes selecting values of signal characteristics (for signals generated by the first and second transducers) that cause constructive interference (and/or destructive interference) to occur between the generated acoustic waves. Specifically, in some embodiments, at least one of the acoustic waves generated by the first lens constructively interferes with at least one of the additional acoustic waves generated by the second lens at a location near one of a user's ears. Constructive and destructive interference are discussed in further detail above with reference to FIGS. 4A-4C.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software, or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated. Furthermore, the various components and embodiments described herein may be combined to form additional embodiments not expressly described.

What is claimed is:

1. An artificial-reality device, comprising:
a head-mounted display including at least one lens; and
one or more transducers, coupled to the head-mounted display, configured to generate signals that vibrate the at least one lens of the head-mounted display, wherein:
the at least one lens generates acoustic waves that correspond to media presented by the head-mounted display when vibrated by the one or more transducers;
characteristics of the signals generated by the one or more transducers cause the acoustic waves generated by the at least one lens to be directed towards at least one ear of a user of the artificial reality device; and
values of the characteristics for the signals are determined based on: (i) the media presented by the head-mounted display and (ii) characteristics of the at least one lens.

2. The artificial-reality device of claim 1, wherein:
the signals have a frequency range; and
the signals vibrate the at least one lens of the head-mounted display within the frequency range.

3. The artificial-reality device of claim 2, wherein the frequency range is from 20 Hz to 20 KHz.

4. The artificial-reality device of claim 1, wherein:
the head-mounted display further includes a frame; and
the one or more transducers include a first transducer that is coupled to the frame of the head-mounted display.

5. The artificial-reality device of claim 4, wherein:
the one or more transducers include a second transducer that is coupled to the at least one lens of the head-mounted display.

6. The artificial-reality device of claim 1, wherein the one or more transducers include a first transducer that is positioned in a user's line of sight.

7. The artificial-reality device of claim 1, wherein:
the at least one lens is a first lens;
the head-mounted display further includes a second lens;
the one or more transducers are further configured to generate signals that vibrate the second lens; and
the second lens generates acoustic waves that correspond to the media presented by the head-mounted display when vibrated by the one or more transducers.

8. The artificial-reality device of claim 7, wherein at least one of the acoustic waves generated by the first lens constructively interferes with at least one of the acoustic waves generated by the second lens at a location near one of a user's ears.

9. The artificial-reality device of claim 7, wherein a first transducer of the one or more transducers is coupled to the first lens and a second transducer of the one or more transducers is coupled to the second lens.

10. The artificial-reality device of claim 1, wherein the head-mounted display does not include any audio generating device other than the at least one lens.

11. The artificial-reality device of claim 1, wherein:
the values of the characteristics for the signals are further determined based on one or more head-related transfer functions (HRTF) computed for a user wearing the head-mounted display.

12. The artificial-reality device of claim 1, wherein:
the characteristics for the signals include one or more of: (i) frequency, (ii) amplitude, and (iii) phase.

13. The artificial-reality device of claim 1, wherein:
the head-mounted display includes a microphone configured to: (i) receive at least some of the acoustic waves generated by the at least one lens, and (ii) generate audio data based on the receiving; and
the one or more transducers are further configured to adjust the characteristics of the signals based on the audio data generated by the microphone.

14. The artificial-reality device of claim 13, wherein adjusting the characteristics of the signals based on the audio data causes the acoustic waves generated by the at least one lens to be focused in a selected direction.

15. A method, comprising:
at an artificial-reality device that includes: (i) a head-mounted display including at least one lens, and (ii) one or more transducers coupled to the head-mounted display:
presenting, by the head-mounted display, media for a virtual scene;
determining, based on: (i) the media presented by the head-mounted display and (ii) characteristics of the at least one lens, values of characteristics for signals that vibrate the at least one lens of the head-mounted display;
generating, by the one or more transducers, the signals that vibrate the at least one lens of the head-mounted display; and
generating, by the at least one lens, acoustic waves that correspond to the media presented by the head-mounted display when the at least one lens is vibrated by the one or more transducers, wherein the characteristics for the signals cause the acoustic waves generated by the at least one lens to be directed towards at least one ear of a user of the artificial reality device.

16. The method of claim 15, wherein the head-mounted display does not include any audio generating device other than the at least one lens.

17. The method of claim 15, wherein:
the characteristics for the signals include one or more of (i) frequency, (ii) amplitude, and (iii) phase.

18. The method of claim 15, wherein:
the head-mounted display includes a microphone for: (i) receiving at least some of the acoustic waves generated by the at least one lens, and (ii) generating audio data based on the receiving; and
the method further comprises:
adjusting, by the one or more transducers, the characteristics of the signals based on the audio data generated by the microphone.

19. The method of claim 15, wherein adjusting the characteristics of the signals based on the audio data causes the acoustic waves generated by the at least one lens to be focused in a selected direction.

20. The method of claim 15, wherein:
the head-mounted display further includes a frame; and
the one or more transducers include a first transducer that is coupled to the frame of the head-mounted display.

* * * * *